(12) United States Patent
Yukawa et al.

(10) Patent No.: US 12,738,854 B2
(45) Date of Patent: Sep. 15, 2026

(54) SEMICONDUCTOR OSCILLATION SUPPRESSION CIRCUIT

(71) Applicant: FUJI ELECTRIC CO., LTD., Kawasaki (JP)

(72) Inventors: Fumio Yukawa, Matsumoto-city (JP); Seiki Igarashi, Saitama-city (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 289 days.

(21) Appl. No.: 17/511,853

(22) Filed: Oct. 27, 2021

(65) Prior Publication Data

US 2022/0052608 A1 Feb. 17, 2022

Related U.S. Application Data

(63) Continuation of application No. PCT/JP2020/038022, filed on Oct. 7, 2020.

(30) Foreign Application Priority Data

Nov. 19, 2019 (JP) ................................ 2019-208464

(51) Int. Cl.
*H02M 3/335* (2006.01)
*H02M 1/00* (2006.01)
(Continued)

(52) U.S. Cl.
CPC ..... *H02M 3/33569* (2013.01); *H02M 1/0058* (2021.05); *H02M 1/088* (2013.01); *H02M 1/346* (2021.05); *H02M 7/537* (2013.01)

(58) Field of Classification Search
CPC .......... H02M 3/22; H02M 3/24; H02M 3/325; H02M 3/335; H02M 3/33569; H02M 1/00;
(Continued)

(56) References Cited

U.S. PATENT DOCUMENTS 4,853,836 A * 8/1989 Furuhashi ............. H02M 7/757 363/58
4,881,159 A * 11/1989 Holtz .................... H02M 7/487 363/58
(Continued)

FOREIGN PATENT DOCUMENTS

CN 109889039 A 6/2019
JP 8-168263 A 6/1996
(Continued)

OTHER PUBLICATIONS

International Search Report dated Nov. 24, 2020 from International Application No. PCT/JP2020/038022, 2 pages.
(Continued)

*Primary Examiner* — Thienvu V Tran
*Assistant Examiner* — Carlos O Rivera-Perez

(57) ABSTRACT

An object of the present invention is to provide a semiconductor oscillation suppression circuit capable of suppressing voltage oscillation of a switching element with low loss. A semiconductor oscillation suppression circuit includes a wide-bandgap semiconductor element and a capacitor connected to the wide-bandgap semiconductor element in parallel and having a larger capacity than a junction capacitance of the wide-bandgap semiconductor element.

20 Claims, 17 Drawing Sheets

(51) Int. Cl.
*H02M 1/088* (2006.01)
*H02M 1/34* (2007.01)
*H02M 7/537* (2006.01)

(58) Field of Classification Search
CPC ............. H02M 1/0048; H02M 1/0054; H02M 1/0058; H02M 1/08; H02M 1/083; H02M 1/084; H02M 1/088; H02M 1/34; H02M 1/342; H02M 1/344; H02M 1/346; H02M 1/348; H02M 1/44; H02M 7/48; H02M 7/4815; H02M 7/53; H02M 7/537; H02M 7/5387; Y02B 70/10
USPC ........ 363/16, 17, 21.02, 21.03, 21.12–21.18, 363/40–43, 50, 55–58, 123, 132–134
See application file for complete search history.

(56) References Cited

U.S. PATENT DOCUMENTS 5,461,556 A * 10/1995 Horie ............... H03K 17/08144 363/58
10,090,761 B2 10/2018 Shimizu et al.
10,581,318 B2 3/2020 Ishikura et al.
2007/0223166 A1* 9/2007 Havanur .......... H03K 17/08142 361/118
2017/0302181 A1 10/2017 Shimuzu et al.
2018/0262101 A1 9/2018 Ishikura et al.
2018/0309438 A1 10/2018 Matsuda et al.
2019/0206810 A1* 7/2019 Kanai ................... H01L 25/162
2020/0350832 A1* 11/2020 Maki ................... H02M 1/0095

FOREIGN PATENT DOCUMENTS

JP 11-206136 A 7/1999
JP 2000116126 A 4/2000
JP 2014-128066 A 7/2014
JP 2017195691 A 10/2017
WO 2017094488 A1 6/2017

OTHER PUBLICATIONS

Written Opinion of the International Searching Authority dated Nov. 24, 2020 from International Application No. PCT/JP2020/038022, 3 pages.
Chinese Office Action dated Jan. 29, 2026 for the corresponding Chinese Patent Application No. 202080032311.X.
German Office Action dated Feb. 24, 2026 for the corresponding German Patent Application No. 112020001689.7.

* cited by examiner

SEMICONDUCTOR OSCILLATION SUPPRESSION CIRCUIT

CROSS-REFERENCE TO RELATED APPLICATIONS

This application is a continuation application filed under 35 U.S.C. § 111(a) of International Patent Application No. PCT/JP2020/038022, filed on Oct. 7, 2020, and claims the priority of Japanese Patent Application No. 2019-208464, filed on Nov. 19, 2019, the contents of both of which are incorporated herein by reference.

TECHNICAL FIELD

The present invention relates to a semiconductor oscillation suppression circuit including a semiconductor switch.

BACKGROUND ART

A power conversion device using a power semiconductor element having a switch element is known (PTL 1).

CITATION LIST

Patent Literature

PTL 1: JP 2014-128066 A

SUMMARY OF INVENTION

Technical Problem

When a SiC device such as a silicon carbide (SiC)-metal-oxide-semiconductor (MOS) field effect transistor (MOS-FET) is used as a power semiconductor element in a power conversion device (for example, a voltage inverter), the SiC device switches at high speed. Therefore, high-frequency voltage oscillation is generated in the SiC device. When a switching speed is suppressed by increasing a gate resistance of the SiC device to suppress the voltage oscillation, a switching loss increases, and there arises a problem that low switching loss characteristics of the SiC device are not utilized.

An object of the present invention is to provide a semiconductor oscillation suppression circuit capable of suppressing voltage oscillation of a switching element with low loss.

Solution to Problem

In order to achieve the object, a semiconductor oscillation suppression circuit according to an aspect of the present invention includes a first wide-bandgap semiconductor element and a first capacitor connected to the first wide-bandgap semiconductor element in parallel and having a larger capacity than a junction capacitance of the first wide-bandgap semiconductor element.

Advantageous Effects of Invention

According to an aspect of the present invention, it is possible to suppress the voltage oscillation of the switching element with low loss.

BRIEF DESCRIPTION OF DRAWINGS

FIG. 1 is a diagram illustrating an example of a circuit configuration of a semiconductor oscillation suppression circuit according to a first embodiment of the present invention;

FIG. 11 is a diagram illustrating an example of a flow of a current in mode 3 at the time of rising of (turning-on) of the semiconductor element included in the semiconductor oscillation suppression circuit according to the first embodiment of the present invention;

FIG. 13A is a diagram illustrating a rising (turning-on) waveform, and FIG. 13B is a diagram illustrating a falling (turning-off) waveform;

FIG. 15A is a diagram illustrating a rising (turning-on) waveform, and FIG. 15B is a diagram illustrating a falling (turning-off) waveform;

DESCRIPTION OF EMBODIMENTS

First Embodiment

Figure 2:
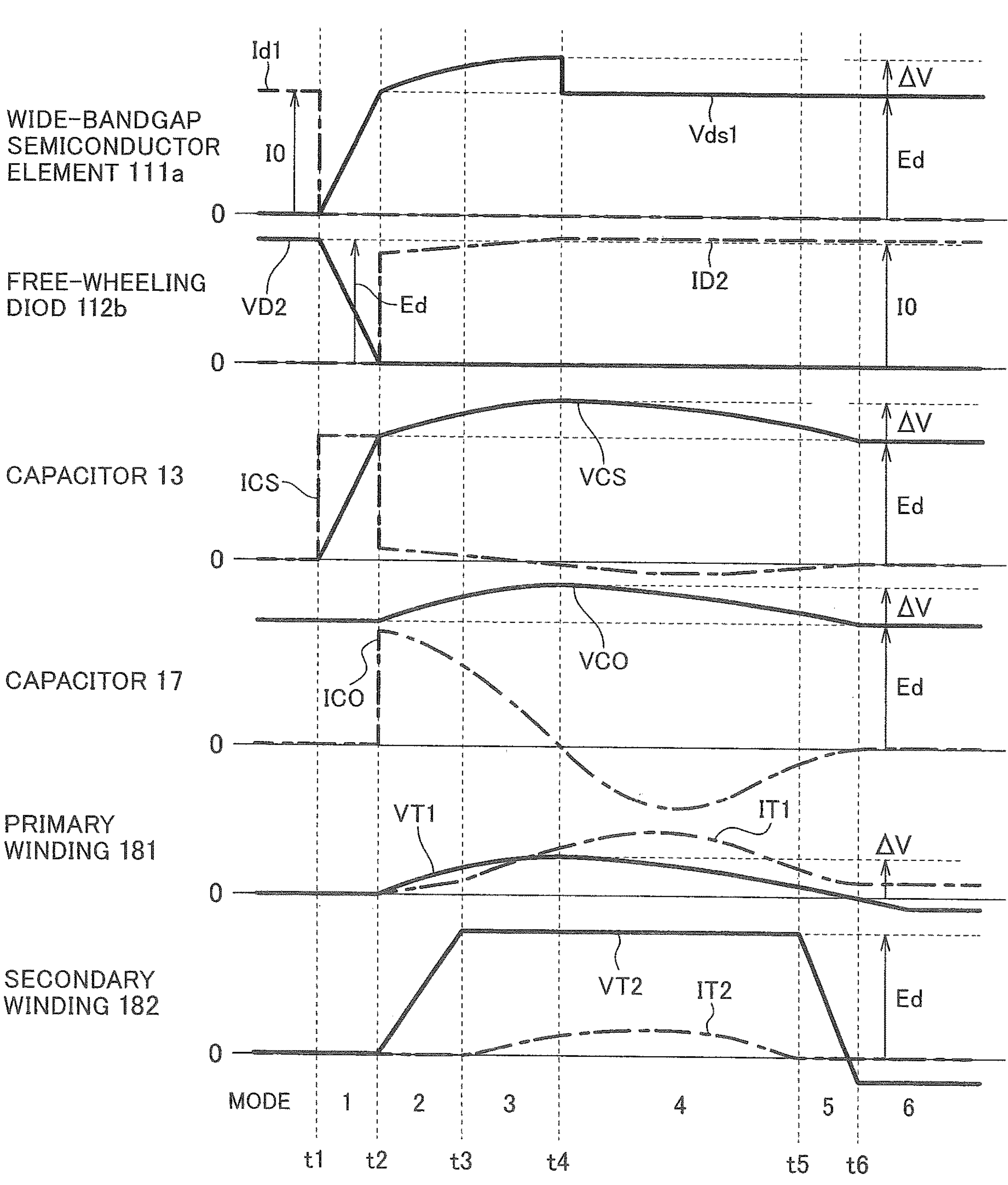
FIG. 2 is a diagram illustrating an example of an operation waveform of the semiconductor oscillation suppression circuit at the time of falling down the (turning-off) of a semiconductor element included in the semiconductor oscillation suppression circuit according to the first embodiment of the present invention.

A semiconductor oscillation suppression circuit according to a first embodiment of the present invention will be described with reference to FIGS. 1 to 11. Firstly, a schematic configuration of the semiconductor oscillation suppression circuit according to the present embodiment will be described with reference to FIG. 1.

Figure 1:
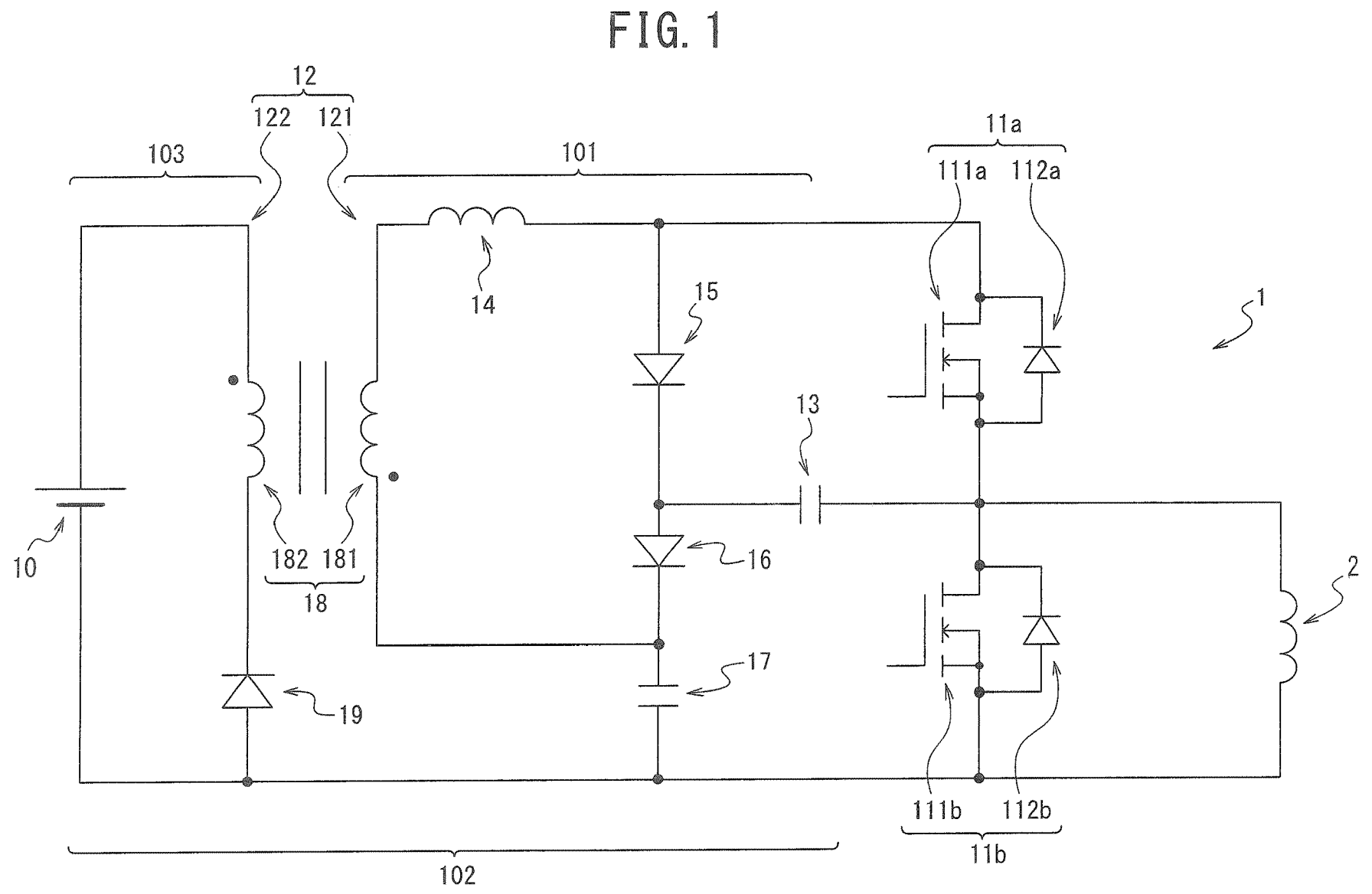

As illustrated in FIG. 1, a semiconductor oscillation suppression circuit 1 according to the present embodiment includes a wide-bandgap semiconductor element 111*a* (which is an example of a first wide-bandgap semiconductor element). Further, the semiconductor oscillation suppression circuit 1 includes a power supply 10 supplying power to the wide-bandgap semiconductor element 111*a*. The power supply 10 is, for example, a direct current power supply. Further, the semiconductor oscillation suppression circuit 1 includes a wide-bandgap semiconductor element 111*b* (which is an example of a second wide-bandgap semiconductor element) connected in series to the wide-bandgap semiconductor element 111*a* between a positive electrode side and a negative electrode side of the power supply 10. The power supply 10 also supplies power to the wide-bandgap semiconductor element 111*b*.

The wide-bandgap semiconductor element 111*a* and the wide-bandgap semiconductor element 111*b* are, for example, a SiC device, a gallium nitride (GaN) device, or a gallium arsenide (GaAs) device. The wide-bandgap semiconductor element 111*a* and the wide-bandgap semiconductor element 111*b* are composed of, for example, an n-type SiC-MOSFET.

A free-wheeling diode 112*a* is connected in inverse-parallel with the wide-bandgap semiconductor element 111*a*. More specifically, a drain of the wide-bandgap semiconductor element 111*a* and a cathode of the free-wheeling diode 112*a* are connected to each other, and a source of the wide-bandgap semiconductor element 111*a* and an anode of the free-wheeling diode 112*a* are connected to each other. The drain of the wide-bandgap semiconductor element 111*a* and the cathode of the free-wheeling diode 112*a* are electrically connected to the positive electrode side of the power supply 10. A semiconductor module 11*a* is composed of the wide-bandgap semiconductor element 111*a* and the free-wheeling diode 112*a*.

A free-wheeling diode 112*b* is connected in inverse-parallel with the wide-bandgap semiconductor element 111*b*. More specifically, a drain of the wide-bandgap semiconductor element 111*b* and a cathode of the free-wheeling diode 112*b* are connected to each other, and a source of the wide-bandgap semiconductor element 111*b* and an anode of the free-wheeling diode 112*b* are connected to each other. The drain of the wide-bandgap semiconductor element 111*b* and the cathode of the free-wheeling diode 112*b* are connected to the source of the wide-bandgap semiconductor element 111*a* and the anode of the free-wheeling diode 112*a*. The source of the wide-bandgap semiconductor element 111*b* and the anode of the free-wheeling diode 112*b* are electrically connected to the negative electrode side of the power supply 10. A semiconductor module 11*b* is composed of the wide-bandgap semiconductor element 111*b* and the free-wheeling diode 112*b*. Therefore, the semiconductor module 11*a* and the semiconductor module 11*b* are connected in series between the positive electrode side and the negative electrode side of the power supply 10.

The semiconductor oscillation suppression circuit 1 includes a diode 15 (which is an example of a second diode) and a diode 16 (which is an example of a third diode) connected in series between the positive electrode side and the negative electrode side of the power supply 10 to be in a forward direction. Further, the semiconductor oscillation suppression circuit 1 includes a capacitor 17 (which is an example of a second capacitor) connected between the cathode of the diode 16 and the negative electrode side of the power supply 10. The capacitor 17 is composed of, for example, an electrolytic capacitor. An anode of the diode 15 is electrically connected to the positive electrode side of the power supply 10, and a cathode of the diode 15 is connected to the anode of the diode 16. The cathode of the diode 16 is connected to one electrode of the capacitor 17. The other electrode of the capacitor 17 is connected to the negative electrode side of the power supply 10. Therefore, the diode 15, the diode 16, and the capacitor 17 are connected in series between the positive electrode side and the negative electrode side of the power supply 10.

The semiconductor oscillation suppression circuit 1 includes a capacitor 13 (which is an example of a first capacitor) connected to the wide-bandgap semiconductor element 111*a* in parallel and having a larger capacity than a junction capacitance of the wide-bandgap semiconductor element 111*a*. The capacitor 13 may have a larger capacity several times (for example, one time) to several hundred times than that of the junction capacitance of the wide-bandgap semiconductor element 111*a*. Further, the capacitor 13 has a larger capacity than a junction capacitance of the wide-bandgap semiconductor element 111*b*. The capacitor 13 may have a larger capacity several times (for example, one time) than that of the junction capacitance of the wide-bandgap semiconductor element 111*b*. Although details will be described later, the semiconductor oscillation suppression circuit 1 includes the capacitor 13 having a larger capacity than the junction capacitance of each of the wide-bandgap semiconductor elements 111*a* and 111*b*, such that it is possible to suppress voltage oscillation at the time of switching of the wide-bandgap semiconductor elements 111*a* and 111*b* with low loss.

The semiconductor oscillation suppression circuit 1 includes a wiring 12 connecting the power supply 10 with the wide-bandgap semiconductor element 111*a* and the capacitor 13. The drain of the wide-bandgap semiconductor element 111*a*, the cathode of the free-wheeling diode 112*a*, and the anode of the diode 15 are connected to the wiring 12.

One electrode of the capacitor 13 is connected to a connection portion between the diode 15 and the diode 16. That is, one electrode of the capacitor 13 is connected to the cathode of the diode 15 and the anode of the diode 16. Therefore, the capacitor 13 is electrically connected to the wiring 12 via the diode 15.

A series circuit composed of the diode 15 and the capacitor 13 is connected to the wide-bandgap semiconductor element 111*a* in parallel between the drain and the source of the wide-bandgap semiconductor element 111*a*. Therefore, the diode 15 and the capacitor 13 are each connected to the wide-bandgap semiconductor element 111*a* in parallel. In addition, a series circuit composed of the capacitor 13, the diode 16, and the capacitor 17 is connected to the wide-bandgap semiconductor element 111*b* in parallel between the drain and the source of the wide-bandgap semiconductor element 111*b*. Therefore, the capacitor 13, the diode 16, and the capacitor 17 are each connected to the wide-bandgap semiconductor element 111*b* in parallel.

The semiconductor oscillation suppression circuit 1 includes a transformer 18 disposed between an end of a first wiring portion (which is an example of a part of the wiring) 121 on a power supply 10 side and one electrode of the capacitor 13. The transformer 18 has a primary winding 181 connected between the end of the first wiring portion 121 and one electrode of the capacitor 13. The transformer 18 has a secondary winding 182 connected to a second wiring portion (which is an example of the other part of the wiring) 122.

The semiconductor oscillation suppression circuit 1 includes a diode 19 (which is an example of a first diode) having a cathode connected to the transformer 18 and an anode connected to the negative electrode side of the power supply 10.

More specifically, one terminal of the primary winding 181 provided in the transformer 18 is connected to a connection portion between the cathode of the diode 16 and one electrode of the capacitor 17. The other terminal of the primary winding 181 is connected to the end of the first wiring portion 121 on the power supply 10 side. Therefore, the primary winding 181 is connected to one electrode of the capacitor 13 via the diode 16, and thus the transformer 18 is disposed between the end of the first wiring portion 121 on the power supply 10 side and the capacitor 13.

One terminal of the secondary winding 182 provided in the transformer 18 is connected to an end of the second wiring portion 122 on a first wiring portion 121 side. The other terminal of the secondary winding 182 is connected to the cathode of the diode 19.

The semiconductor oscillation suppression circuit 1 includes a reactor 14 provided in the first wiring portion 121. One terminal of the reactor 14 is connected to the other terminal of the primary winding 181 and one terminal of the secondary winding 182 provided in the transformer 18. The other terminal of the reactor 14 is connected to the anode of the diode 15 and the drain of the wide-bandgap semiconductor element 111*a*.

The semiconductor oscillation suppression circuit 1 includes a first current path 101 having the first wiring portion 121 and one electrode of the capacitor 13. Since the reactor 14 is provided in the first wiring portion 121, the first current path 101 includes the reactor 14. In addition, the first current path 101 has the diode 15 and the diode 16 connected in series between the positive electrode side and the negative electrode side of the power supply 10 to be in a forward direction. The first current path 101 has the transformer 18 disposed between the first wiring portion 121 on the power supply 10 side and one electrode of the capacitor 13, and the primary winding 181 of the transformer 18 is disposed between the first wiring portion 121 and one electrode of the capacitor 13. Therefore, the first current path 101 is a circuit having the reactor 14, the diode 15, the diode 16, and the primary winding 181 of the transformer 18. One electrode of the capacitor 13 is connected to the connection portion between the diode 15 and the diode 16 by a conducting wire. Therefore, one electrode of the capacitor 13 becomes a component constituting the first current path 101 between the diode 15 and the diode 16. As a result, the first current path 101 constitutes a closed circuit with the reactor 14, the diode 15, one electrode of the capacitor 13, the diode 16, and the primary winding 181 of the transformer 18.

The semiconductor oscillation suppression circuit 1 includes a second current path 102 having the first wiring portion 121 and the capacitor 13. Since the reactor 14 is provided in the first wiring portion 121, the second current path 102 includes the reactor 14. The diode 15 is disposed between the first wiring portion 121 and the capacitor 13. Therefore, the second current path 102 is a circuit having the reactor 14, the diode 15, and the capacitor 13.

The semiconductor oscillation suppression circuit 1 includes a third current path 103 having the power supply 10, the second wiring portion 122, and the transformer 18. The third current path 103 has the diode 19 having the cathode connected to the transformer 18 and the anode connected to the negative electrode side of the power supply 10. The secondary winding 182 of the transformer 18 is connected to the diode 19. Therefore, the third current path 103 is a circuit having the power supply 10, the second wiring portion 122, the secondary winding 182, and the diode 19. Further, the third current path 103 constitutes a closed circuit with a positive electrode of the power supply 10, the second wiring portion 122, the secondary winding 182 of the transformer 18, the diode 19, and a negative electrode of the power supply 10.

Although not illustrated, a gate drive circuit for driving the wide-bandgap semiconductor element 111*a* is connected to a gate of the wide-bandgap semiconductor element 111*a*, and a gate drive circuit for driving the wide-bandgap semiconductor element 111*b* is connected to a gate of the wide-bandgap semiconductor element 111*b*. Furthermore, although not illustrated, the semiconductor oscillation suppression circuit 1 is connected to a control device that controls the gate drive circuits. The wide-bandgap semiconductor elements 111*a* and 111*b* are controlled to be switched by the control device and the gate drive circuits, and the semiconductor oscillation suppression circuit 1 is configured so that a direct current voltage supplied from the power supply 10 is converted into an alternating current voltage and alternating power is supplied to a load 2 connected to the semiconductor module 11*b*. As described above, a power conversion device (voltage-type inverter device in the present embodiment) is composed of the semiconductor oscillation suppression circuit 1, the control device (not illustrated), and the gate drive circuits (not illustrated). The semiconductor oscillation suppression circuit 1 functions as a power conversion unit of the power conversion device.

(Operation of Semiconductor Oscillation Suppression Circuit)

Next, an operation of the semiconductor oscillation suppression circuit according to the present embodiment will be described with reference to FIGS. 2 to 11. Firstly, regarding the operation of the semiconductor oscillation suppression circuit 1, an operation at the time of falling down (turning-off) of the wide-bandgap semiconductor element 111*a*, that is, at the time of transition from an on state (conductive state) to an off state (non-conductive state) will be described with reference to FIGS. 2 to 7.

(Principle of Operation at Time of Turning-Off)

In a first stage of FIG. 2, waveforms of a voltage Vds1 and a current Id1 of the wide-bandgap semiconductor element 111*a* are illustrated. In a second stage of FIG. 2, waveforms of a voltage VD2 and a current ID2 of the free-wheeling diode 112*b* are illustrated. In a third stage of FIG. 2, waveforms of a voltage VCS and a current ICS of the capacitor 13 are illustrated. In a fourth stage of FIG. 2, waveforms of a voltage VCO and a current ICO of the capacitor 17 are illustrated. In a fifth stage of FIG. 2, waveforms of a voltage VT1 and a current IT1 of the primary winding 181 of the transformer 18 are illustrated. In a sixth stage of FIG. 2, waveforms of a voltage VT2 and a current IT2 of the secondary winding 182 of the transformer 18 are illustrated. A horizontal axis illustrated in each stage of FIG. 2 represents a time, and a vertical axis illustrated in each stage represents a voltage and a current. In addition, the horizontal axis illustrated in each stage of FIG. 2 represents the lapse of time from left to right.

As illustrated in FIG. 2, an operation at the time of turning-off of the semiconductor oscillation suppression circuit 1 according to the present embodiment enables a mode to be divided into six modes of mode 1 from time t1 to time t2, mode 2 from time t2 to time t3, mode 3 from time t3 to time t4, mode 4 from time t4 to time t5, mode 5 from time t5 to time t6, and mode 6 after time t6. The semiconductor oscillation suppression circuit 1 regenerates energy accumulated in the reactor 14 to the power supply 10 from mode 1 to mode 6.

When the wide-bandgap semiconductor element 111*a* is in the on state before time t1 as illustrated in FIG. 2, a current flows through a path of "power supply 10→reactor 14 (wiring 12)→wide-bandgap semiconductor element 111*a*→load 2→power supply 10" in the semiconductor oscillation suppression circuit 1. As a result, the energy is supplied from the power supply 10 of the semiconductor oscillation suppression circuit 1 to the load 2. At this time, as illustrated in FIG. 2, the capacitor 13 is not charged and the voltage VCS is 0 V, the capacitor 17 is charged to the same voltage as an output voltage Ed of the power supply 10, and the voltage VCO has the same value as the output voltage Ed.

<Mode 1>

Figure 3:
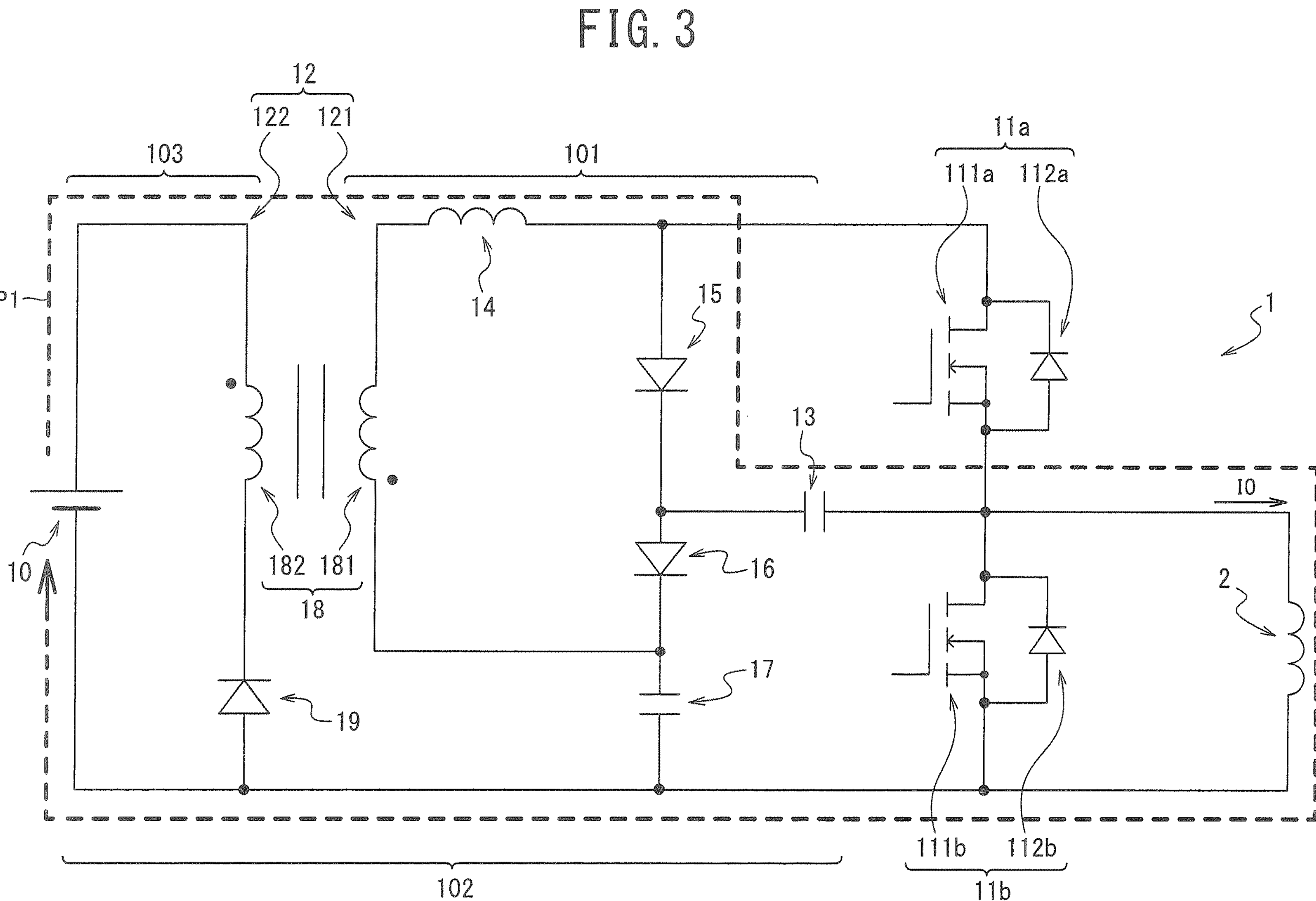
FIG. 3 is a diagram illustrating an example of a flow of a current in mode 1 at the time of falling down (turning-off) of the semiconductor element included in the semiconductor oscillation suppression circuit according to the first embodiment of the present invention.

When the wide-bandgap semiconductor element 111*a* transitions from the on state to the off state (turned off) in time t1, a load current Io flows through a path P1 of "power supply 10→second wiring portion 122→transformer 18→reactor 14 (first wiring portion 121)→diode 15, capacitor 13→load 2→power supply 10" as illustrated in FIG. 3. As a result, a current is transferred to the capacitor 13 to charge the capacitor 13.

The capacitor 13 and the wide-bandgap semiconductor element 111*a* are connected in parallel. Therefore, as the capacitor 13 is charged, the voltage Vds1 (that is, the voltage between the drain and the source) of the wide-bandgap semiconductor element 111*a* also increases following the increase in the voltage VCS between both electrodes of the capacitor 13. Therefore, as illustrated in FIG. 2, a voltage increase rate of the wide-bandgap semiconductor element 111*a* in mode 1 is suppressed by a charging speed of the capacitor 13. In this case, the wide-bandgap semiconductor element 111*a* performs a zero voltage switching (ZVS) operation in which switching is performed in a state where the voltage Vds1 is zero. As a result, turn-off loss of the wide-bandgap semiconductor element 111*a* is reduced. Further, the capacitor 13 has a larger capacity than the junction capacitance of the wide-bandgap semiconductor element 111*a*. Therefore, the voltage increase rate of the wide-bandgap semiconductor element 111*a* in mode 1 is smaller than that in a case where the capacitor 13 is not provided. As a result, the turn-off loss of the wide-bandgap semiconductor element 111*a* in mode 1 is smaller than that in a case where the capacitor 13 is not provided. As such, it is possible for the semiconductor oscillation suppression circuit 1 according to the present embodiment to further suppress the turn-off loss of the wide-bandgap semiconductor element 111*a*.

Further, as illustrated in FIG. 2, the voltage VCS of the capacitor 13 increases to the output voltage Ed of the power supply 10 in mode 1. Therefore, in mode 1, the voltage Vds1 of the wide-bandgap semiconductor element 111*a* also increases to the output voltage Ed of the power supply 10. As a result, the voltage VD2 of the free-wheeling diode 112*b* decreases to 0 V as the voltage Vds1 of the wide-bandgap semiconductor element 111*a* increases.

<Mode 2>

As illustrated in FIG. 2, at time t2, the voltage Vds1 of the wide-bandgap semiconductor element 111*a* becomes higher than the output voltage Ed of the power supply 10 due to the generation of a surge voltage. As a result, in mode 2, a potential of the cathode of the free-wheeling diode 112*b* becomes negative, and therefore, the free-wheeling diode 112*a* is conductive. As a result, as illustrated in FIG. 4, a load current I0 recirculates in a path P2 of "load 2→free-wheeling diode 112*a*→load 2".

Figure 4:
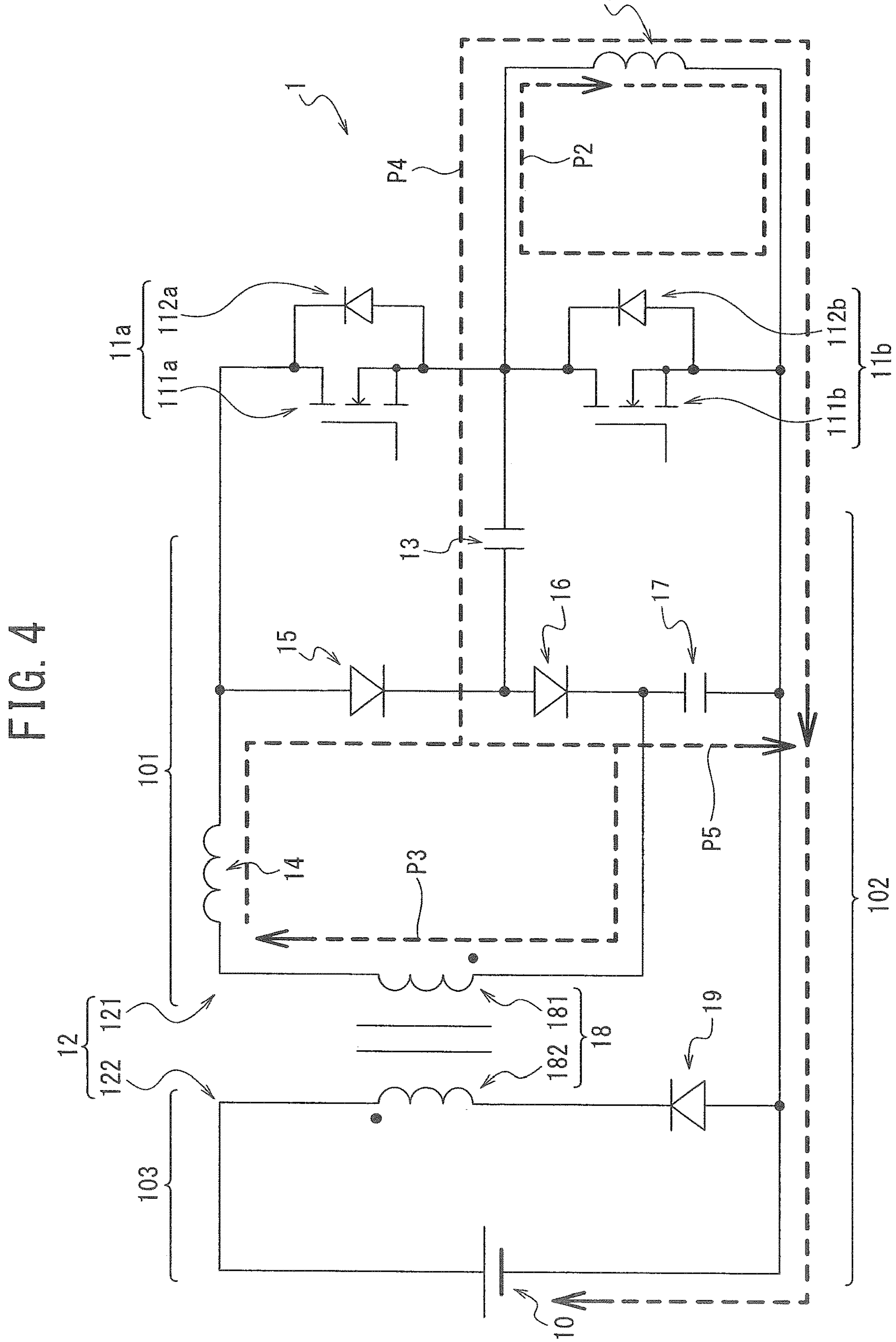
FIG. 4 is a diagram illustrating an example of a flow of a current in mode 2 at the time of falling down (turning-off) of the semiconductor element included in the semiconductor oscillation suppression circuit according to the first embodiment of the present invention.

In addition, as illustrated in FIG. 4, since the diodes 15 and 16 are conductive in mode 2, some energy accumulated in the reactor 14 transfers to the primary winding 181 of the transformer 18 through the first current path 101, that is, a path P3 of "reactor 14 (first wiring portion 121)→diode 15→one electrode of capacitor 13→diode 16→primary winding 181→reactor 14".

In addition, as illustrated in FIG. 4, some of the remaining energy accumulated in the reactor 14 transfers to the capacitor 13 through the second current path 102, that is, a path P4 of "reactor 14 (first wiring portion 121)→diode 15→capacitor 13→load 2→power supply 10". Further, as illustrated in FIG. 4, the rest of the energy accumulated in the reactor 14 transfers to the capacitor 17 through a path P5 of "reactor 14 (first wiring portion 121)→diode 15→diode 16, capacitor 17 power supply 10". As such, the part of the energy accumulated in the reactor 14 is transferred to the primary winding 181, and the rest of the energy is transferred to a parallel capacitance formed by the capacitor 13 and the capacitor 17 through the path P4 and the path P5.

As illustrated in FIG. 2, in mode 2, the voltage VT1 of the primary winding 181, the voltage VCS of the capacitor 13, and the voltage VCO of the capacitor 17 increase. Further, as illustrated in FIG. 2, in mode 2, the secondary winding 182 of the transformer 18 generates the voltage VT2 times a winding ratio of the secondary winding 182 to the primary winding 181.

<Mode 3>

Figure 5:
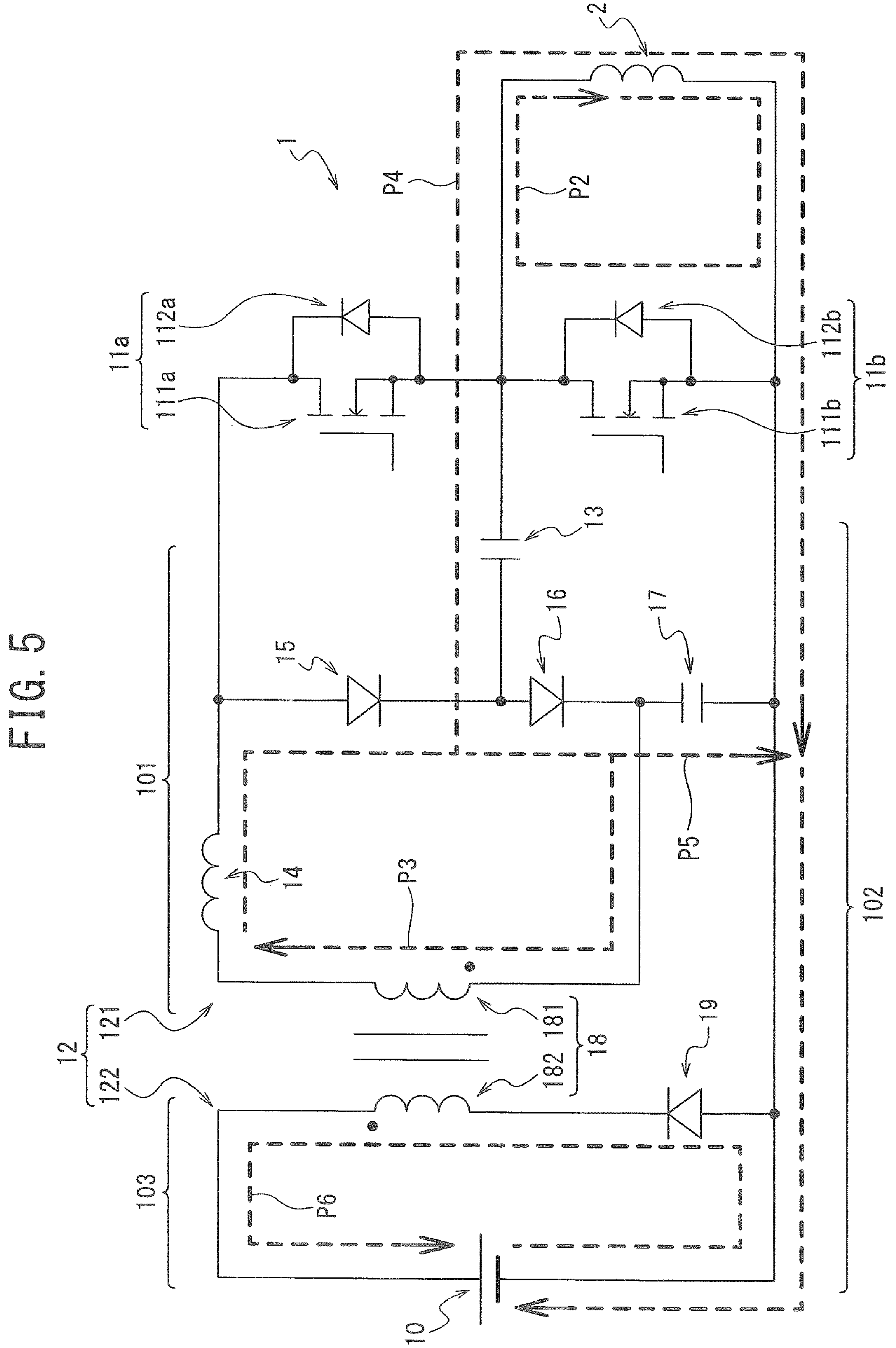
FIG. 5 is a diagram illustrating an example of a flow of a current in mode 3 at the time of falling down (turning-off) of the semiconductor element included in the semiconductor oscillation suppression circuit according to the first embodiment of the present invention.

As illustrated in FIG. 2, at time t3, when the voltage VT2 of the secondary winding 182 of the transformer 18 becomes higher than a voltage obtained by adding a threshold voltage of the diode 19 to the output voltage Ed of the power supply 10, the diode 19 is conductive. When the diode 19 is conductive, the voltage VT2 of the secondary winding 182 is clamped to the output voltage Ed of the power supply 10. At this time, as illustrated in FIG. 5, the energy transferred to the primary winding 181 of the transformer 18 regenerates to the power supply 10 via the third current path 103, that is, a path P6 of "secondary winding 182 of transformer 18→second wiring portion 122→power supply 10". The reactor 14 provided in the first current path 101 (that is, the path P3) serves as a leakage reactance of the transformer 18. Therefore, in mode 3, the current IT2 flowing through the secondary winding 182 is a value obtained by dividing the current IT1 flowing through the primary winding 181 by the winding ratio of the primary winding 181 and the secondary winding 182.

<Mode 4>

Figure 6:
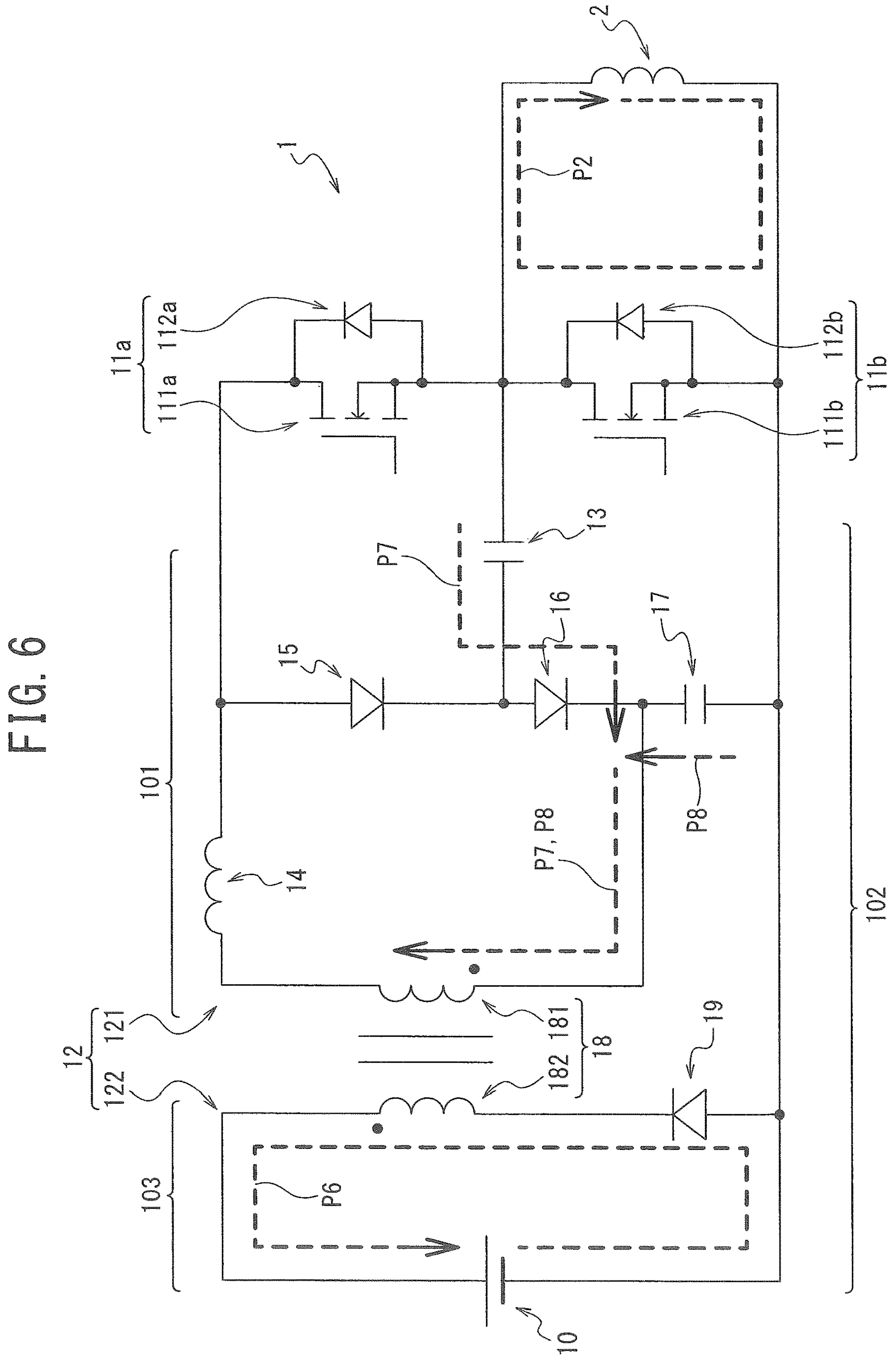
FIG. 6 is a diagram illustrating an example of a flow of a current in modes 4 and 5 at the time of falling down (turning-off) of the semiconductor element included in the semiconductor oscillation suppression circuit according to the first embodiment of the present invention.

As illustrated in FIG. 2, when the energy of the reactor 14 becomes zero at time t4, the current ICS flowing through the capacitor 13 and the current ICO flowing through the capacitor 17 switch from a charging current to a discharge current. Therefore, as illustrated in FIG. 6, the energy accumulated in the capacitor 13 transfers to the primary winding 181 through a path P7 of "capacitor 13→diode 16→primary winding 181 of transformer 18". In addition, the energy accumulated in the capacitor 17 is transferred to the primary winding 181 through a path P8 of "capacitor 17→primary winding 181 of transformer 18". Therefore, as illustrated in FIG. 2, the voltage VCS of the capacitor 13 and the voltage VCO of the capacitor 17 decrease in mode 4. Further, the energy transferred to the primary winding 181 of the transformer 18 is regenerated to the power supply 10 through the third current path 103 (that is, the path P6) via the secondary winding 182 during a period of mode 4 in which the voltage VT2 of the secondary winding 182 of the transformer 18 is the output voltage Ed of the power supply 10.

<Mode 5>

As illustrated in FIG. 2, the capacitor 13 transfers the energy to the primary winding 181 of the transformer 18 through the path P7 (see FIG. 6) until the voltage VCS is the same as the output voltage Ed of the power supply 10, in mode 5 which is a period from time t5 to time t6. In addition, the capacitor 17 transfers the energy to the primary winding 181 of the transformer 18 through the path P8 (see FIG. 6) until the voltage VCO is the same as the output voltage Ed of the power supply 10. The energy transferred to the primary winding 181 of the transformer 18 is regenerated to the power supply 10 through the third current path 103 (that is, the path P6) via the secondary winding 182 of the transformer 18. As such, the energy accumulated in the capacitor 13 and the capacitor 17 is regenerated to the power supply 10 in mode 4 and mode 5.

<Mode 6>

Figure 7:
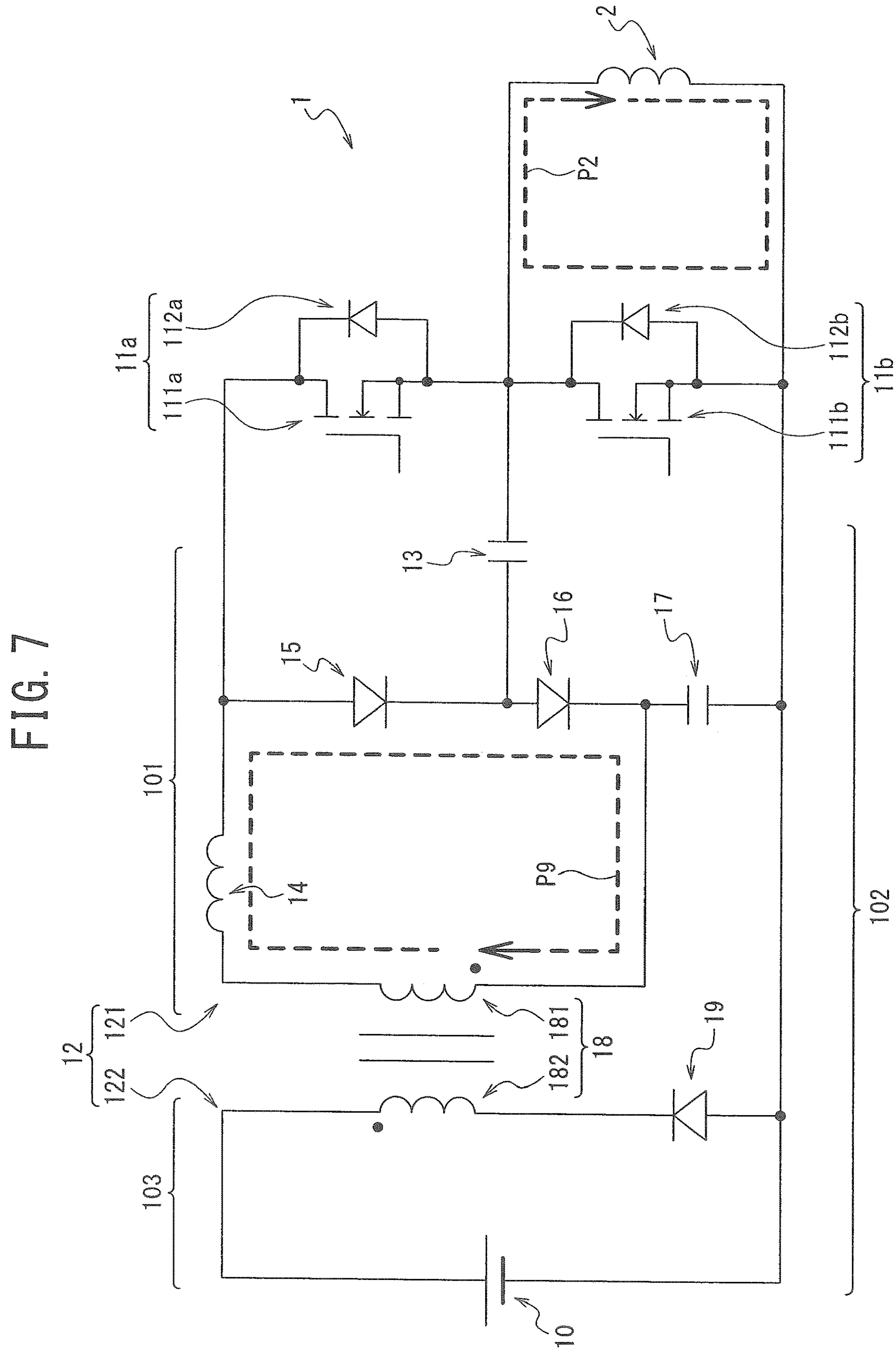
FIG. 7 is a diagram illustrating an example of a flow of a current in mode 6 at the time of falling down (turning-off) of the semiconductor element included in the semiconductor oscillation suppression circuit according to the first embodiment of the present invention.

As illustrated in FIG. 2, at time t6, when the voltage VCS of the capacitor 13 and the voltage VCO of the capacitor 17 are the same as the output voltage Ed of the power supply 10, the diode 15 conducts while accumulating the energy in the primary winding 181 of the transformer 18. As illustrated in FIG. 7, in mode 6, the energy accumulated in the primary winding 181 of the transformer 18 recirculates in the first current path 101, that is, a path P9 of "primary winding 181→reactor 14 (first wiring portion 121)→diode 15→diode 16", and is consumed as conduction loss of the diode 15 and the diode 16.

(Principle of Operation at Time of Turning-On)

Figure 8:
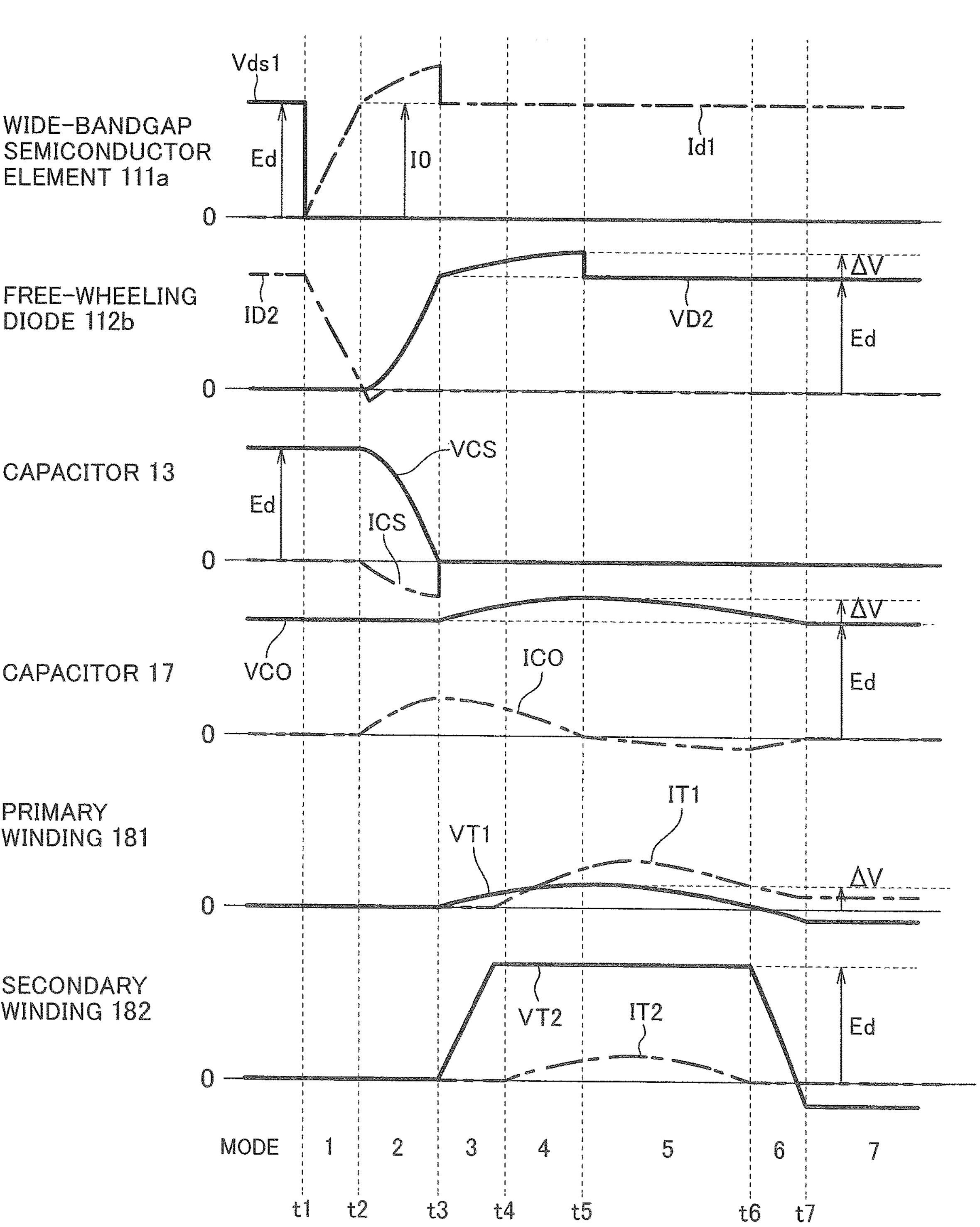
FIG. 8 is a diagram illustrating an example of an operation waveform of the semiconductor oscillation suppression circuit at the time of rising of (turning-on) of the semiconductor element included in the semiconductor oscillation suppression circuit according to the first embodiment of the present invention.

Next, regarding the operation of the semiconductor oscillation suppression circuit 1, an operation at the time of rising (turning-on) of the wide-bandgap semiconductor element 111*a*, that is, at the time of transition from the off state (non-conductive state) to the on state (conductive state) will be described with reference to FIGS. 8 to 11. In a first stage of FIG. 8, waveforms of a voltage Vds1 and a current Id1 of the wide-bandgap semiconductor element 111*a* are illustrated. In a second stage of FIG. 8, waveforms of a voltage VD2 and a current ID2 of the free-wheeling diode 112*b* are illustrated. In a third stage of FIG. 8, waveforms of a voltage VCS and a current ICS of the capacitor 13 are illustrated. In a fourth stage of FIG. 8, waveforms of a voltage VCO and a current ICO of the capacitor 17 are illustrated. In a fifth stage of FIG. 8, waveforms of a voltage VT1 and a current IT1 of the primary winding 181 of the transformer 18 are illustrated. In a sixth stage of FIG. 8, waveforms of a voltage VT2 and a current IT2 of the secondary winding 182 of the transformer 18 are illustrated. A horizontal axis illustrated in each stage of FIG. 8 represents a time, and a vertical axis illustrated in each stage represents a voltage and a current. In addition, the horizontal axis illustrated in each stage of FIG. 8 represents the lapse of time from left to right.

As illustrated in FIG. 8, an operation at the time of turning-on of the semiconductor oscillation suppression circuit 1 according to the present embodiment enables a mode to be divided into seven modes of mode 1 from time t1 to time t2, mode 2 from time t2 to time t3, mode 3 from time t3 to time t4, mode 4 from time t4 to time t5, mode 5 from time t5 to time t6, mode 6 from time t6 to time t7, and mode 7 after time t7. The semiconductor oscillation suppression circuit 1 regenerates energy accumulated in the capacitor 13 to the power supply 10 from mode 1 to mode 7.

When the wide-bandgap semiconductor element 111*a* is in the off state before time t1 illustrated in FIG. 8, a load current recirculates in a path of "load 2, free-wheeling diode 112*b*→load 2". At this time, since an output voltage Ed of the power supply 10 is applied to the capacitor 13 via the diode 15, the voltage VCS of the capacitor 13 is the same as the output voltage Ed.

<Mode 1>

Figure 9:
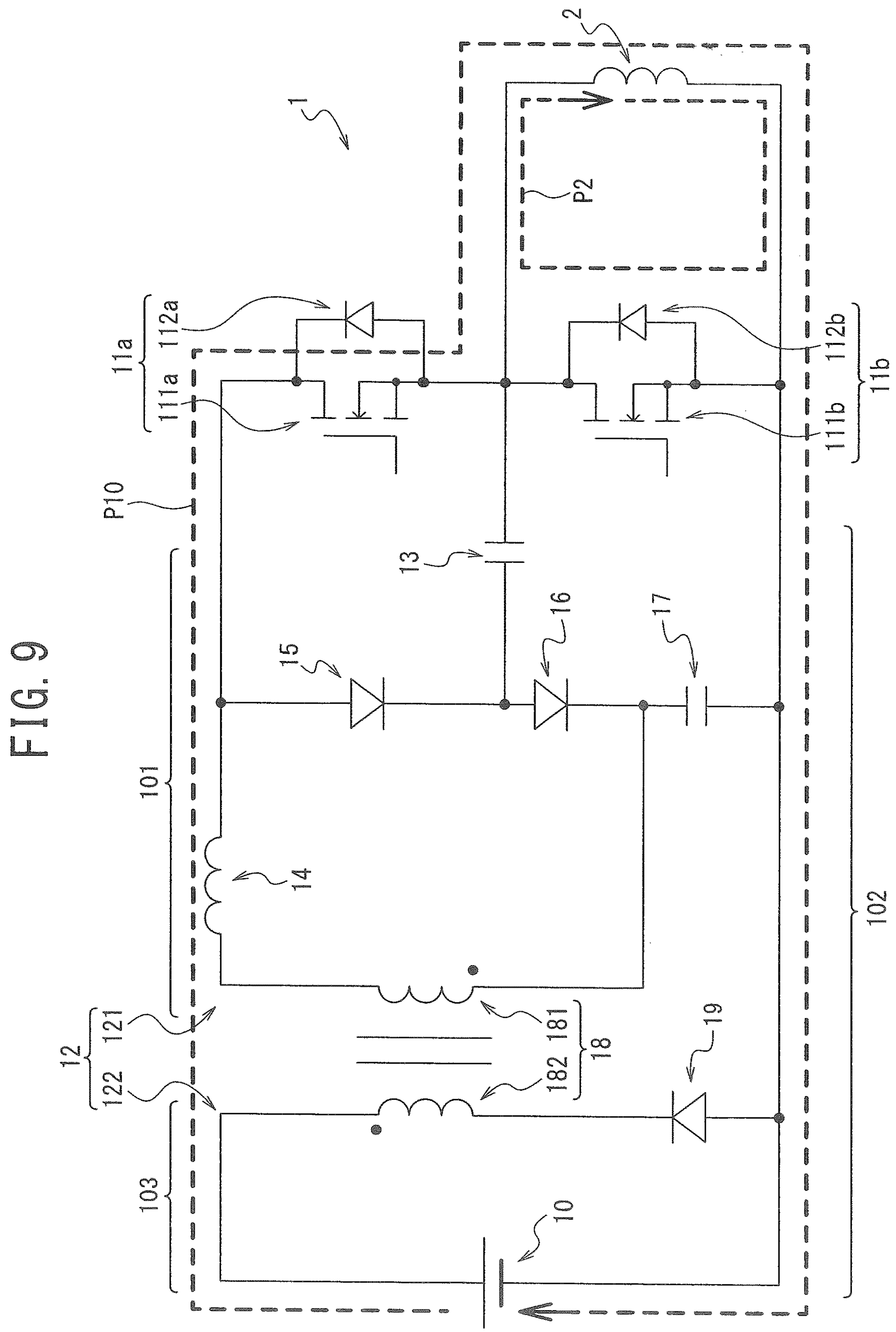
FIG. 9 is a diagram illustrating an example of a flow of a current in mode 1 at the time of rising of (turning-on) of the semiconductor element included in the semiconductor oscillation suppression circuit according to the first embodiment of the present invention.

At time t1, when the wide-bandgap semiconductor element 111*a* transitions from the off state to the on state (turned on), a current flows through a path P10 of "power supply 10→second wiring portion 122→transformer 18→reactor 14 (first wiring portion 121)→wide-bandgap semiconductor element 111*a*→load 2→power supply 10" as illustrated in FIG. 9. As illustrated in FIG. 9, in the path P10, the reactor 14 and the wide-bandgap semiconductor element 111*a* are connected in series. Therefore, as illustrated in FIG. 8, an increase rate of the current Id1 of the wide-bandgap semiconductor element 111*a* is suppressed by a current increase rate of the reactor 14 in mode 1. In this case, the wide-bandgap semiconductor element 111*a* performs a zero current switching (ZCS) operation in which switching is performed in a state where the current ICE is zero. As a result, turn-on loss of the wide-bandgap semiconductor element 111*a* is reduced.

In addition, in mode 1, the voltage Vds1 of the wide-bandgap semiconductor element 111*a* decreases as the current Id1 of the wide-bandgap semiconductor element 111*a* increases. Therefore, the voltage of the cathode of the free-wheeling diode 112*b* provided in the semiconductor module 11*b* increases. Therefore, as illustrated in FIG. 8, the current ID2 flowing through the free-wheeling diode 112*b* decreases as the current Id1 of the wide-bandgap semiconductor element 111*a* increases. When the current Id1 of the wide-bandgap semiconductor element 111*a* reaches a value of the load current I0 flowing into the load 2, the free-wheeling diode 112*b* recovers in reverse.

<Mode 2>

Figure 10:
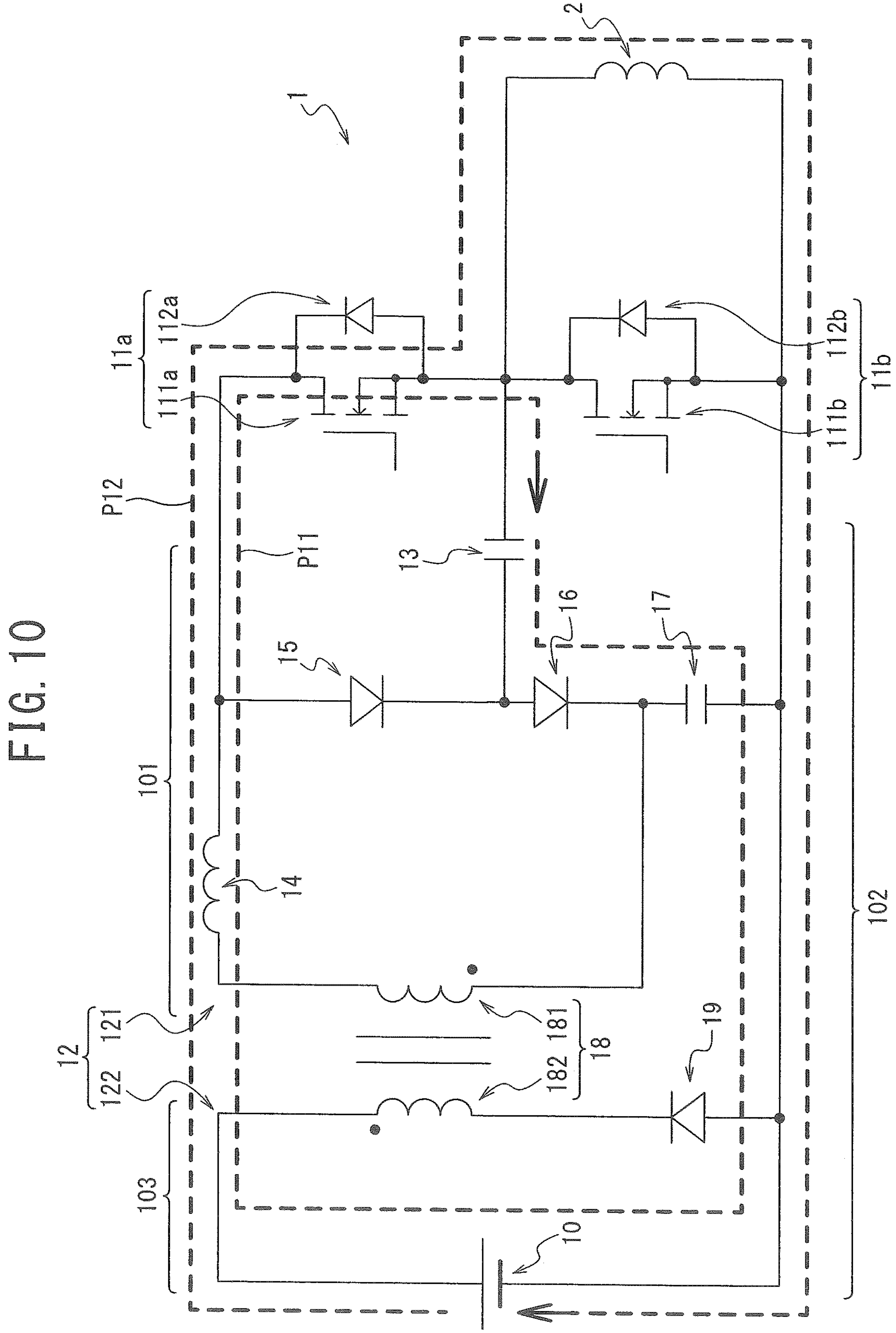
FIG. 10 is a diagram illustrating an example of a flow of a current in mode 2 at the time of rising of (turning-on) of the semiconductor element included in the semiconductor oscillation suppression circuit according to the first embodiment of the present invention.

Due to the reverse recovery of the free-wheeling diode 112*b*, the source of the wide-bandgap semiconductor element 111*a*, that is, the other electrode of the capacitor 13 is electrically insulated from the negative electrode of the power supply 10. Therefore, at time t2 illustrated in FIG. 8, a path P11 of "capacitor 13→diode 16→capacitor 17→power supply 10→second wiring portion 122→transformer 18→reactor 14 (first wiring portion 121), wide-bandgap semiconductor element 111*a*→capacitor 13" is formed as illustrated in FIG. 10. The energy accumulated in the capacitor 13 transfers to the reactor 14 through the path P11. As a result, the voltage VCS of the capacitor 13 is discharged up to 0 V in mode 2, as illustrated in FIG. 8. The voltage increase rate of the free-wheeling diode 112*b* is suppressed by a discharge speed of the capacitor 13. Therefore, reverse recovery loss of the free-wheeling diode 112*b* is also reduced.

Further, in mode 2, power is supplied from the power supply 10 to the load 2 through a path P12 of "power supply 10→second wiring portion 122→transformer 18→reactor 14 (first wiring portion 121)→wide-bandgap semiconductor element 111*a*→load 2→power supply 10", as illustrated in FIG. 10.

<Mode 3>

Figure 11:
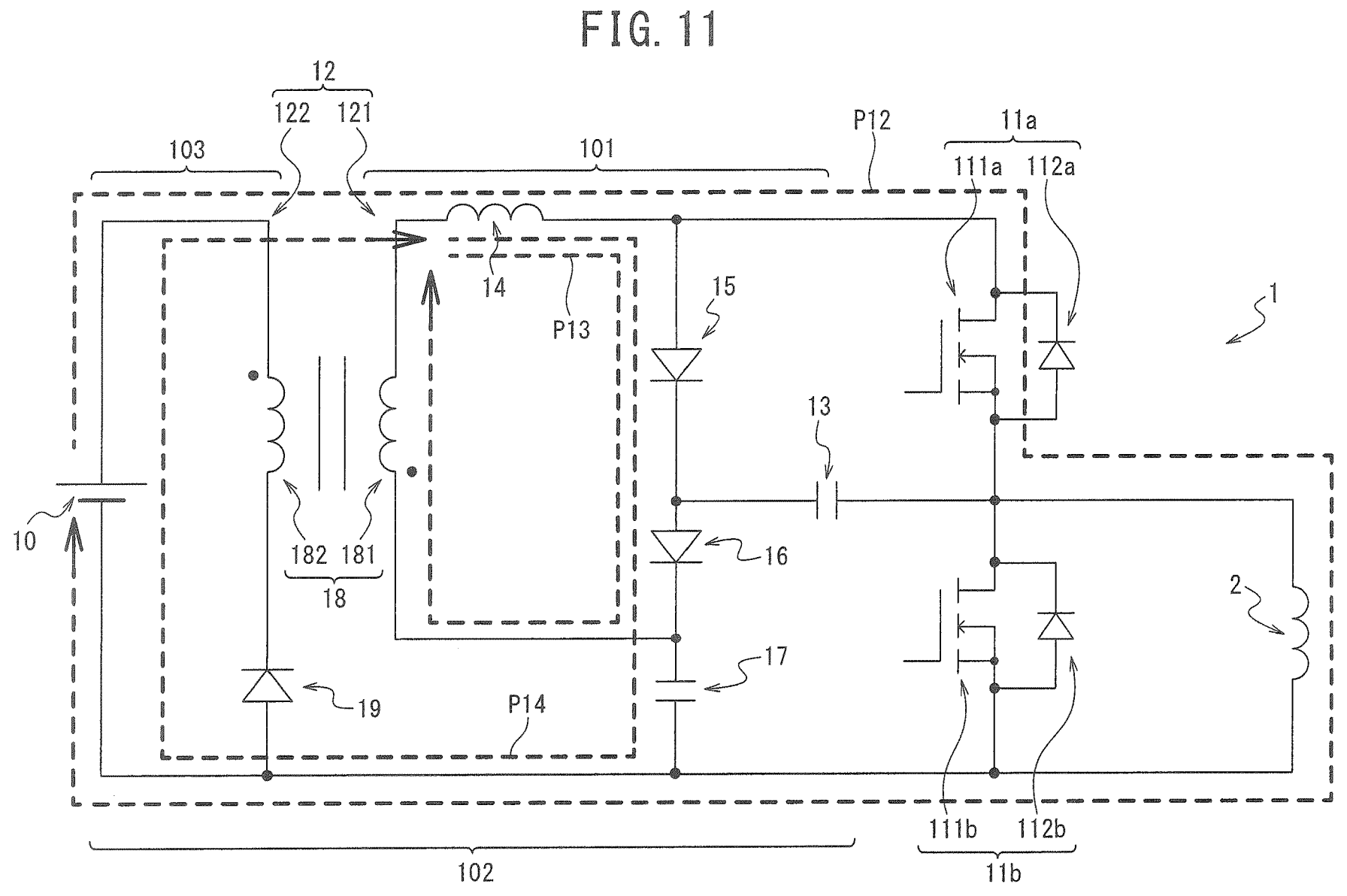

At time t3 when the voltage VCS of the capacitor 13 is 0 V (see FIG. 8), the diode 16 is conductive. As a result, some energy accumulated in the reactor 14 transfers to the primary winding 181 of the transformer 18 through the first current path 101, that is, the path P3 of "reactor 14 (first wiring portion 121)→diode 15→one electrode of capacitor 13→diode 16→primary winding 181→reactor 14", as illustrated in FIG. 11. Further, as illustrated in FIG. 11, the rest of the energy accumulated in the reactor 14 transfers to the capacitor 17 through a path P14 of "reactor 14 (first wiring portion 121)→diode 15→diode 16→capacitor 17→power supply 10". As such, the part of the energy accumulated in the reactor 14 transfers to the primary winding 181, and the rest of the energy transfers to a parallel capacitance formed by the capacitor 13 and the capacitor 17 through the path P13 and the path P14.

As illustrated in FIG. 8, in mode 3, the voltage VT1 of the primary winding 181, the voltage VCS of the capacitor 13, and the voltage VCO of the capacitor 17 increase. Further, as illustrated in FIG. 8, in mode 3, the secondary winding 182 of the transformer 18 generates the voltage VT2 times a winding ratio of the primary winding 181.

<Mode 4 to Mode 7>

As illustrated in FIG. 8, the operation of the semiconductor oscillation suppression circuit 1 in mode 4 at the time of turning-on of the wide-bandgap semiconductor element 111*a* is the same as that in mode 3 at the time of turning-off of the wide-bandgap semiconductor element 111*a*. The operation of the semiconductor oscillation suppression circuit 1 in mode 5 at the time of turning-on of the wide-bandgap semiconductor element 111*a* is the same as that in mode 4 at the time of turning-off of the wide-bandgap semiconductor element 111*a*. The operation of the semiconductor oscillation suppression circuit 1 in mode 6 at the time of turning-on of the wide-bandgap semiconductor element 111*a* is the same as that in mode 5 at the time of turning-off of the wide-bandgap semiconductor element 111*a*. The operation of the semiconductor oscillation suppression circuit 1 in mode 7 at the time of turning-on of the wide-bandgap semiconductor element 111*a* is the same as that in mode 6 at the time of turning-off of the wide-bandgap semiconductor element 111*a*. Therefore, the description of the operations of the semiconductor oscillation suppression circuit 1 in modes 4 to 7 at the time of turning-on of the wide-bandgap semiconductor element 111*a* will be omitted.

Although the detailed description will be omitted, the semiconductor oscillation suppression circuit 1 is operated in the same manner as the turning-on and turning-off of the wide-bandgap semiconductor element 111*a* even in a case of turning-on and turning-off of the wide-bandgap semiconductor element 111*b*.

As described above, the semiconductor oscillation suppression circuit 1 according to the present embodiment includes the wide-bandgap semiconductor element 111*a* and the capacitor 13 connected to the wide-bandgap semiconductor element 111*a* in parallel and having a larger capacity than the junction capacitance of the wide-bandgap semiconductor element 111*a*.

According to the semiconductor oscillation suppression circuit 1 having the configuration, it is possible to reduce the voltage increase rate at the time of turning-off of the wide-bandgap semiconductor element 111*a*. As a result, it is possible for the semiconductor oscillation suppression circuit 1 to suppress voltage oscillation of the wide-bandgap semiconductor element 111*a*, and furthermore, the semiconductor module 11*a* with low loss.

Further, it is possible for the semiconductor oscillation suppression circuit 1 to suppress the voltage increase rate of the free-wheeling diode 112*b* at the time of turning-on of the wide-bandgap semiconductor element 111*a*. Therefore, it is possible for the semiconductor oscillation suppression circuit 1 to suppress the voltage oscillation of the semiconductor module 11*b* having the free-wheeling diode 112*b* with low loss.

Second Embodiment

A semiconductor oscillation suppression circuit according to a second embodiment of the present invention will be described with reference to FIGS. 12 to 15. Components having the same effects and functions as those of the semiconductor oscillation suppression circuit 1 according to the first embodiment are denoted by the same reference numerals and the description will be omitted.

Figure 12:
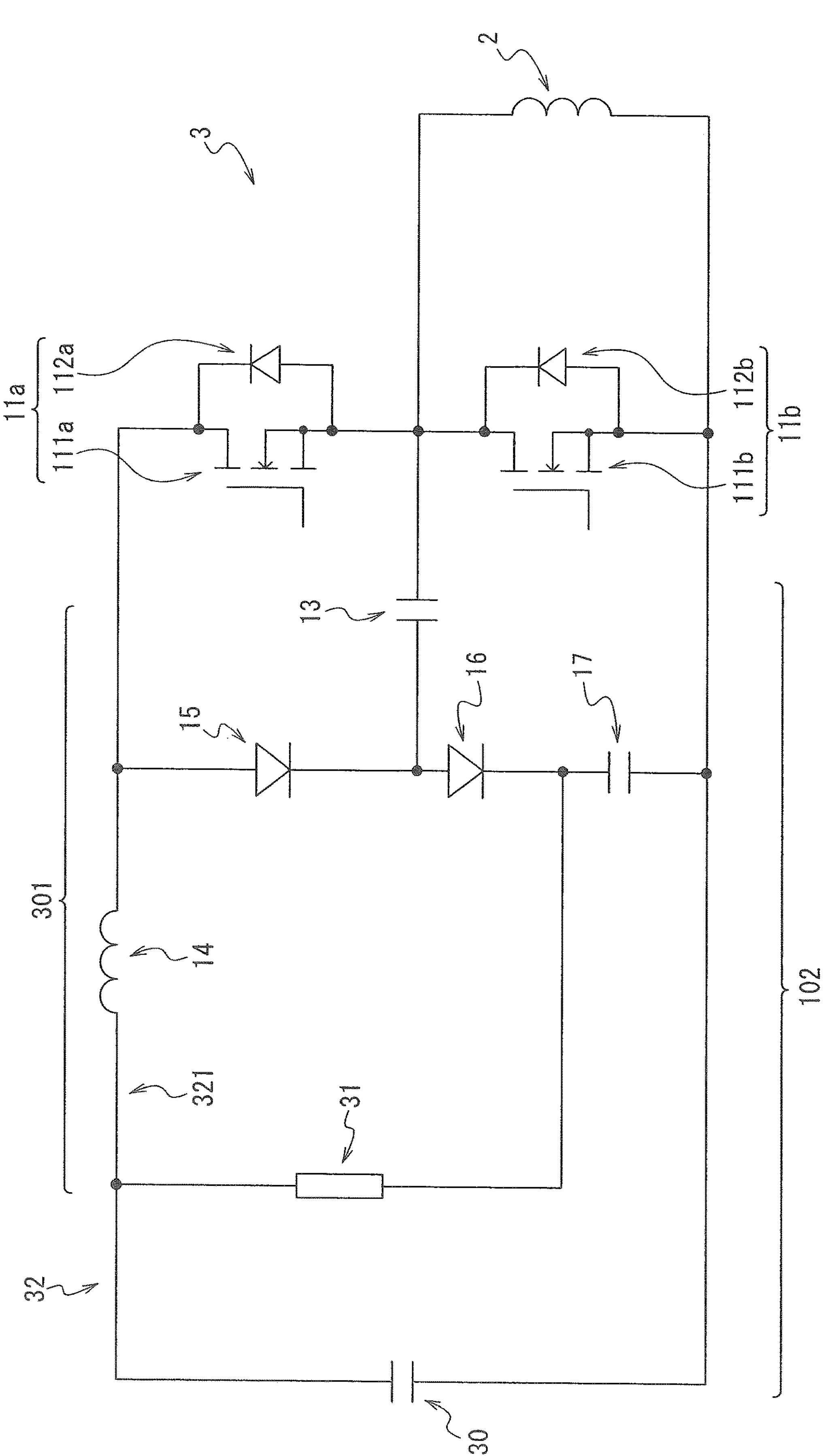
FIG. 12 is a diagram illustrating an example of a circuit configuration of a semiconductor oscillation suppression circuit according to a second embodiment of the present invention.

As illustrated in FIG. 12, a semiconductor oscillation suppression circuit 3 according to the present embodiment includes a power supply 30 that supplies power to the wide-bandgap semiconductor element 111*a*. The power supply 30 is, for example, a capacitor having a larger capacity than a capacitor 33 (to be described later) and a capacitor 37 (to be described later). The power supply 30 may be composed of, for example, an electrolytic capacitor. A positive electrode side of the power supply 30 is, for example, one electrode of the capacitor constituting the power supply 30 (electrode on the positive electrode side). A negative electrode side of the power supply 30 is, for example, the other electrode of the capacitor constituting the power supply 30 (electrode on the negative electrode side). The power supply 30 also supplies power to the wide-bandgap semiconductor element 111*b*.

The semiconductor oscillation suppression circuit 3 includes a wiring 32 connecting the power supply 30 with the wide-bandgap semiconductor element 111*a* and the capacitor 13. The drain of the wide-bandgap semiconductor element 111*a*, the cathode of the free-wheeling diode 112*a*, and the anode of the diode 15 are connected to the wiring 32. One electrode of the capacitor 13 is connected to a connection portion between the diode 15 and the diode 16. That is, one electrode of the capacitor 13 is connected to the cathode of the diode 15 and the anode of the diode 16. Therefore, the capacitor 13 is electrically connected to the wiring 32 via the diode 15.

The semiconductor oscillation suppression circuit 3 includes a resistance element 31 that is disposed between an end of a first wiring portion (which is an example of a part of the wiring) 321 on a power supply 30 side and one electrode of the capacitor 13. One terminal of the resistance element 31 is connected to one terminal of the reactor 14 provided in the first wiring portion 321 and the positive electrode side of the power supply 30. The other terminal of the resistance element 31 is connected to a connection portion of the diode 16 and the capacitor 17. More specifically, the other terminal of the resistance element 31 is connected to the cathode of the diode 16 and one electrode of the capacitor 17. As described above, the semiconductor oscillation suppression circuit 3 according to the present embodiment is characterized in that it includes the resistance element 31 instead of the transformer 18 and the diode 19 as compared with the semiconductor oscillation suppression circuit 1 according to the first embodiment.

The semiconductor oscillation suppression circuit 3 includes a first current path 301 having the first wiring portion 321 and one electrode of the capacitor 13. Since the reactor 14 is provided in the first wiring portion 321, the first current path 301 includes the reactor 14. In addition, the first current path 301 includes the diode 15 and the diode 16 that are connected in series between the positive electrode side and the negative electrode side of the power supply 30 to be in a forward direction. The first current path 301 has the resistance element 31 disposed between the first wiring portion 321 on the side of the power supply 30 and one electrode of the capacitor 13. The resistance element 31 is disposed between the first wiring portion 321 and one electrode of the capacitor 13. Therefore, the first current path 301 is a circuit having the reactor 14, the diode 15, the diode 16, and the resistance element 31. One electrode of the capacitor 13 is connected to the connection portion between the diode 15 and the diode 16 by a conducting wire. Therefore, one electrode of the capacitor 13 becomes a component constituting the first current path 301 between the diode 15 and the diode 16. As a result, the first current path 301 constitutes a closed circuit with the reactor 14, the diode 15, one electrode of the capacitor 13, the diode 16, and the resistance element 31.

The semiconductor oscillation suppression circuit 3 includes a second current path 302 having the first wiring portion 321 and the capacitor 13. Since the reactor 14 is provided in the first wiring portion 321, the second current path 302 includes the reactor 14. The diode 15 is disposed between the first wiring portion 321 and the capacitor 13. Therefore, the second current path 302 is a circuit having the reactor 14, the diode 15, and the capacitor 13.

Unlike the semiconductor oscillation suppression circuit 1 according to the first embodiment, the semiconductor oscillation suppression circuit 3 does not have a transformer and a diode connected in series between the positive electrode side and the negative electrode side of the power supply 30. Therefore, unlike the semiconductor oscillation suppression circuit 1 according to the first embodiment, the semiconductor oscillation suppression circuit 3 does not include a third current path.

Although not illustrated, even in the present embodiment, a gate drive circuit for driving the wide-bandgap semiconductor element 111*a* is connected to a gate of the wide-bandgap semiconductor element 111*a*, and a gate drive circuit for driving the wide-bandgap semiconductor element 111*b* is connected to a gate of the wide-bandgap semiconductor element 111*b*. Furthermore, although not illustrated, a control device that controls the gate drive circuits is connected to the semiconductor oscillation suppression circuit 3. The wide-bandgap semiconductor elements 111*a* and 111*b* are controlled to be switched by the control device and the gate drive circuits, and the semiconductor oscillation suppression circuit 3 is configured so that a direct current voltage supplied from the power supply 30 is converted into an alternating current voltage and alternating power is supplied to the load 2 connected to the semiconductor module 11*b*. As described above, a power conversion device (voltage-type inverter device in the present embodiment) is composed of the semiconductor oscillation suppression circuit 3, the control device (not illustrated), and the gate drive circuits (not illustrated). The semiconductor oscillation suppression circuit 3 functions as a power conversion unit of the power conversion device.

(Operation of Semiconductor Oscillation Suppression Circuit)

Next, an operation of the semiconductor oscillation suppression circuit according to the present embodiment will be described with reference to FIGS. 13 and 14.

Since the wide-bandgap semiconductor element 111*b* is in the on state before the wide-bandgap semiconductor element 111*a* transitions from the off state to the on state (turned on), the capacitor 13 and the capacitor 17 are charged to the output voltage Ed of the power supply 30.

If the wide-bandgap semiconductor element 111*a* transitions to the on state (turned on) when the wide-bandgap semiconductor element 111*b* transitions from the on state to the off state and the capacitor 13 and the capacitor 17 are in the above-described charged state, a current flows through a path of "reactor 14→wide-bandgap semiconductor element 111*a*→load 2".

If the wide-bandgap semiconductor element 111*a* is turned on, a voltage of the wide-bandgap semiconductor element 111*b* (potential of the drain of the wide-bandgap semiconductor element 111*b*) increases. As the voltage of the wide-bandgap semiconductor element 111*b* increases, the capacitor 13 discharges until it reaches 0 V. The current flows through a path of "capacitor 13→diode 16→capacitor 17→load 2", and the capacitor 13 is discharged.

Since the capacitor 13 is connected to the wide-bandgap semiconductor elements 111*a* and 111*b* in parallel, the capacitor 13 is connected to the junction capacitance of each of the wide-bandgap semiconductor elements 111*a* and 111*b* in parallel. The capacitor 13 in the present embodiment has a larger capacity than the junction capacitance of each of the wide-bandgap semiconductor elements 111*a* and 111*b*. As a result, it is possible for the semiconductor oscillation suppression circuit 3 to suppress the voltage oscillation of the semiconductor module 11*b* at the time of switching (turning-on) of the wide-bandgap semiconductor element 111*a* with low loss, similarly to the semiconductor oscillation suppression circuit 1 according to the first embodiment.

When the wide-bandgap semiconductor element 111*a* transitions from the on state to the off state (turned off), the capacitor 13 is charged from the state of 0 V to the output voltage Ed of the power supply 30 through a path of "power supply 30→reactor 14 (first wiring portion 121)→diode 15→capacitor 13→load 2→power supply 30". As the wide-bandgap semiconductor element 111*a* is turned off, the voltage increase rate of the wide-bandgap semiconductor element 111*a* is suppressed by the charging speed of the capacitor 13. The capacitor 13 has a larger capacity than the junction capacitance of the wide-bandgap semiconductor element 111*a*. Therefore, the voltage increase rate of the wide-bandgap semiconductor element 111*a* in mode 1 is smaller than that in a case where the capacitor 13 is not provided. As a result, it is possible for the semiconductor oscillation suppression circuit 3 to suppress oscillation at the time of switching of the wide-bandgap semiconductor element 111*a*.

Although the detailed description will be omitted, the semiconductor oscillation suppression circuit 3 is operated in the same manner as the turning-on and turning-off of the wide-bandgap semiconductor element 111*a* even in a case of turning-on and turning-off of the wide-bandgap semiconductor element 111*b*.

Figure 13A:
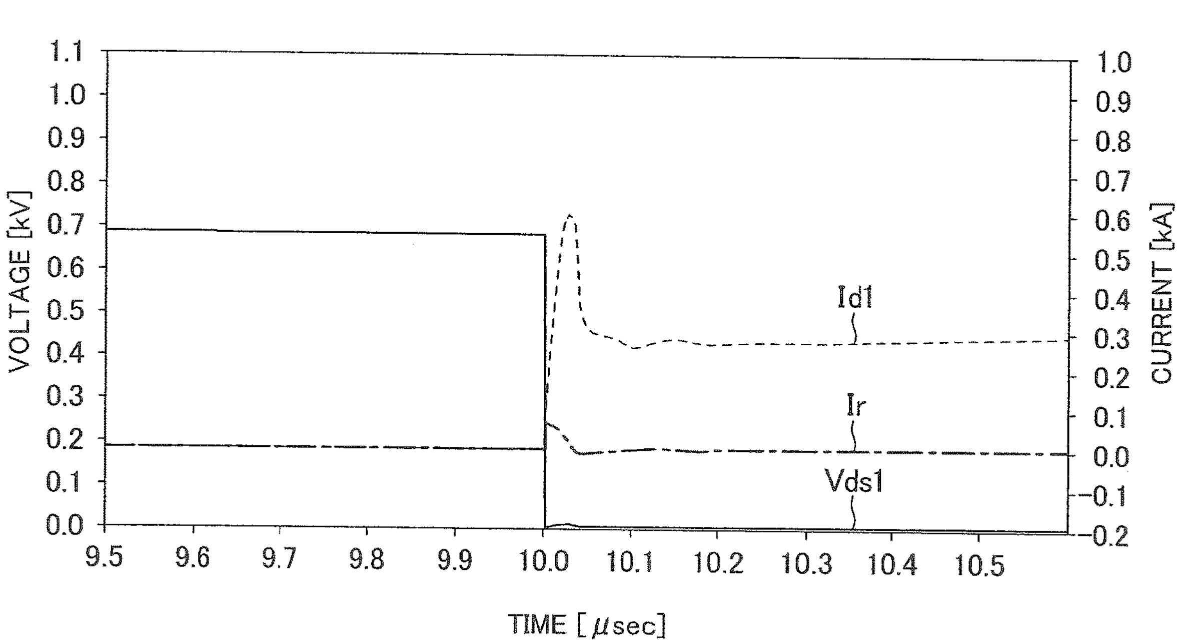
FIGS. 13A and 13B are diagrams illustrating a simulation result of an operation waveform at the time of switching of a semiconductor element included in the semiconductor oscillation suppression circuit according to the second embodiment of the present invention.
Figure 13B:
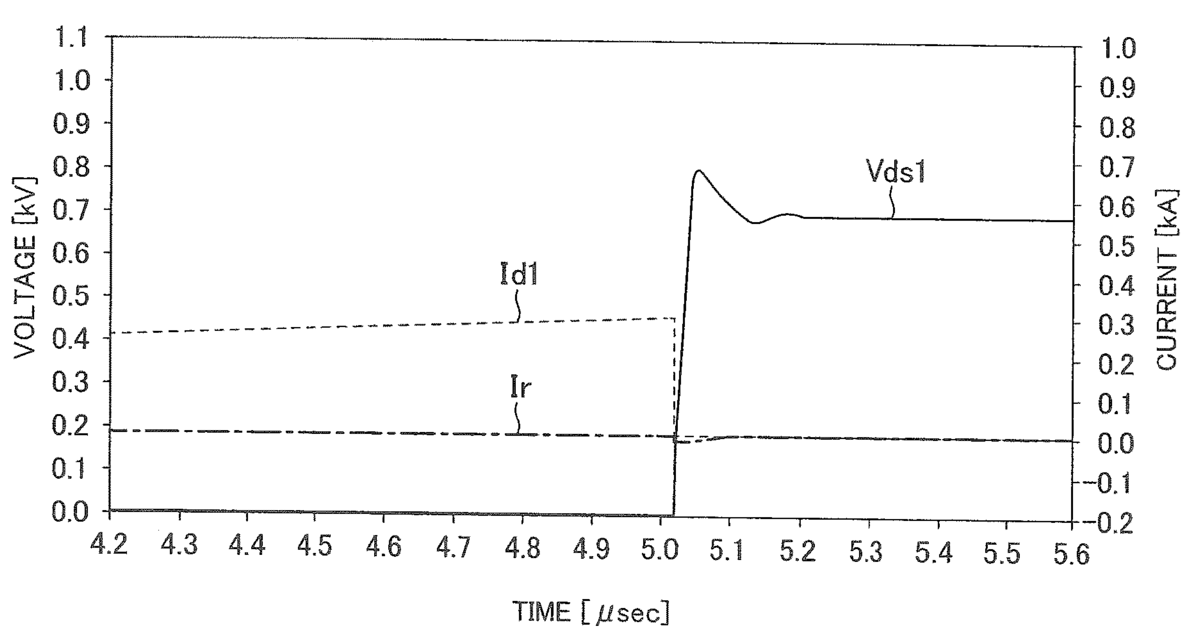

Here, an example of waveforms of an operation simulation of the semiconductor oscillation suppression circuit 3 will be described with reference to FIGS. 13A and 13B. FIGS. 13A and 13B illustrate waveforms of the operation simulation when the output voltage Ed of the power supply 30 is 600 V, a current supplied to the load is 300 A, an inductance of the reactor 14 is 20 nH, and a capacity of the capacitor 13 is 8 nF. "Vds1" indicated by a solid line in FIGS. 13A and 13B represents a voltage waveform of the wide-bandgap semiconductor element 111*a*. "Id1" indicated by a broken line in FIGS. 13A and 13B represents a current waveform of the wide-bandgap semiconductor element 111*a*. "Ir" indicated by an alternate long and short dash line in FIGS. 13A and 13B represents a current waveform of the resistance element 31. The vertical axis on the left side of FIGS. 13A and 13B represents a voltage for the voltage waveform of the wide-bandgap semiconductor element 111*a*. The vertical axis on the right side of FIGS. 13A and 13B represents a current for the current waveform of each of the wide-bandgap semiconductor element 111*a* and the resistance element 31. The horizontal axis of FIGS. 13A and 13B represents a time. The horizontal axis represents the lapse of time from left to right.

As illustrated in FIG. 13A, when the wide-bandgap semiconductor element 111*a* transitions from the off state to the on state (turned on) at the time of 10.0 psec, an increase rate of the current Id1 flowing through the wide-bandgap semiconductor element 111*a* is controlled by an increase rate of the current flowing through the reactor 14. Thus, the increase rate of the current Id1 becomes slow as compared with the conventional semiconductor oscillation suppression circuit (to be described later). In addition, the energy accumulated in the capacitor 13 before the time of 10.0 μsec is discharged to the load 2. Therefore, the energy consumed by the resistance element 31 is reduced.

As illustrated in FIG. 13B, when the wide-bandgap semiconductor element 111*a* transitions from the on state to the off state (turned off) at the time of 5.02 μsec, an increase rate of the voltage Vds1 of the wide-bandgap semiconductor element 111*a* is controlled by the charging speed of the capacitor 13. Thus, the increase rate of the voltage Vds1 becomes slow as compared with the conventional semiconductor oscillation suppression circuit (to be described later). Further, when the wide-bandgap semiconductor element 111*a* transitions from the on state to the off state (turned off), the energy accumulated in the reactor 14 is consumed by the resistance element 31 via the capacitor 13. However, as illustrated in FIG. 13B, fluctuation of the current Ir flowing through the resistance element 31 at the time of 5.02 μsec is small as compared with the conventional semiconductor oscillation suppression circuit (to be described later). Therefore, it is possible for the semiconductor oscillation suppression circuit 3 in the present embodiment to reduce the loss at the time of switching of the wide-bandgap semiconductor element 111*a*.

Next, the conventional semiconductor oscillation suppression circuit will be described with reference to FIGS. 14 and 15, as a comparative example of the semiconductor oscillation suppression circuit 3 according to the present embodiment.

Figure 14:
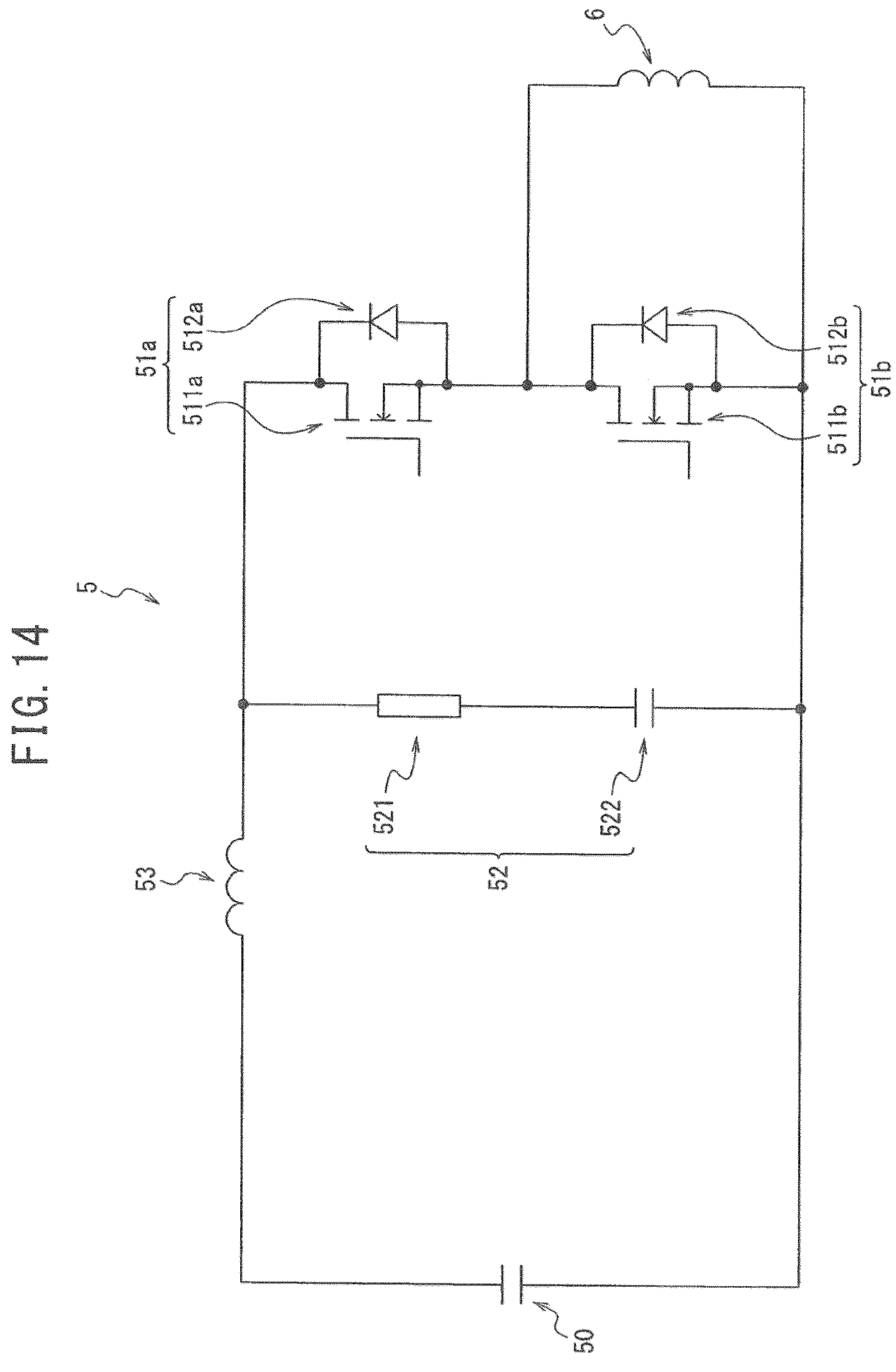
FIG. 14 is a diagram illustrating an example of a configuration of a conventional semiconductor oscillation suppression circuit.

As illustrated in FIG. 14, a conventional semiconductor oscillation suppression circuit 5 includes a power supply 50, and a semiconductor module 51*a* and a semiconductor module 51*b* connected in series between a positive electrode side and a negative electrode side of the power supply 50. The power supply 50 is composed of, for example, an electrolytic capacitor. The positive electrode side of the power supply 50 is, for example, one electrode of the capacitor constituting the power supply 50 (electrode on the positive electrode side). The negative electrode side of the power supply 50 is, for example, the other electrode of the capacitor constituting the power supply 50 (electrode on the negative electrode side).

The semiconductor module 51*a* has a wide-bandgap semiconductor element 511*a* and a free-wheeling diode 512*a* connected in inverse-parallel with the wide-bandgap semiconductor element 511*a*. A drain of the wide-bandgap semiconductor element 511*a* and a cathode of the free-wheeling diode 512*a* are connected to each other, and a source of the wide-bandgap semiconductor element 511*a* and an anode of the free-wheeling diode 512*a* are connected to each other. The drain of the wide-bandgap semiconductor element 511*a* and the cathode of the free-wheeling diode 512*a* are electrically connected to the positive electrode side of the power supply 50.

The semiconductor module 51*b* has a wide-bandgap semiconductor element 511*b* and a free-wheeling diode 512*b* connected in inverse-parallel with the wide-bandgap semiconductor element 511*b*. A drain of the wide-bandgap semiconductor element 511*b* and a cathode of the free-wheeling diode 512*b* are connected to each other, and a source of the wide-bandgap semiconductor element 511*b* and an anode of the free-wheeling diode 512*b* are connected to each other. The drain of the wide-bandgap semiconductor element 511*b* and the cathode of the free-wheeling diode 512*b* are electrically connected to the negative electrode side of the power supply 50.

The drain of the wide-bandgap semiconductor element 511*b* and the cathode of the free-wheeling diode 512*b* are connected to the source of the wide-bandgap semiconductor element 511*a* and the anode of the free-wheeling diode 512*a*. Therefore, the wide-bandgap semiconductor element 511*a* and the wide-bandgap semiconductor element 511*b* are connected in series between the positive electrode side and the negative electrode side of the power supply 50.

The semiconductor oscillation suppression circuit 5 has a snubber circuit 52 connected to a series circuit composed of the semiconductor module 51*a* and the semiconductor module 51*b* in parallel. The snubber circuit 52 has a resistance element 521 and a capacitor 522 connected in series between the positive electrode side and the negative electrode side of the power supply 50. One terminal of the resistance element 521 is connected to the positive electrode side of the power supply 50, the drain of the wide-bandgap semiconductor element 511*a*, and the cathode of the free-wheeling diode 512*a*. The other terminal of the resistance element 521 is connected to one electrode of the capacitor 522. The other electrode of the capacitor 522 is connected to the negative electrode side of the power supply 50, the source of the wide-bandgap semiconductor element 511*b*, and the anode of the free-wheeling diode 512*b*. The snubber circuit 52 is provided to suppress voltage oscillation generated at the time of switching of the wide-bandgap semiconductor element 511*a* and the wide-bandgap semiconductor element 511*b*.

The semiconductor oscillation suppression circuit 5 has a reactor 53 connected between the positive electrode side of the power supply 50 and the snubber circuit 52 and the semiconductor module 51*a*. One terminal of the reactor 53 is connected to the positive electrode side of the power supply 50. The other terminal of the reactor 53 is connected to one terminal of the resistance element 521, the drain of the wide-bandgap semiconductor element 511*a*, and the cathode of the free-wheeling diode 512*a*.

Although not illustrated, a gate drive circuit for driving the wide-bandgap semiconductor element 511*a* is connected to a gate of the wide-bandgap semiconductor element 511*a*, and a gate drive circuit for driving the wide-bandgap semiconductor element 511*b* is connected to a gate of the wide-bandgap semiconductor element 511*b*. Furthermore, although not illustrated, a control device that controls the gate drive circuits is connected to the semiconductor oscillation suppression circuit 5. The wide-bandgap semiconductor elements 511*a* and 511*b* are controlled to be switched by the control device and the gate drive circuits, and the semiconductor oscillation suppression circuit 5 is configured so that a direct current voltage supplied from the power supply 50 is converted into an alternating current voltage and alternating power is supplied to a load 6 connected to the semiconductor module 51*b*. As described above, a power conversion device (voltage-type inverter device in the comparative example) is composed of the semiconductor oscillation suppression circuit 5, the control device (not illustrated), and the gate drive circuits (not illustrated). The semiconductor oscillation suppression circuit 5 functions as a power conversion unit of the power conversion device.

The wide-bandgap semiconductor element 511*a* transitions from the off state to the on state (turned on), and power is thus supplied by a path of "power supply 50→reactor 53→wide-bandgap semiconductor element 511*a*→load 6". In addition, the wide-bandgap semiconductor element 511*a* transitions from the on state to the off state (turned off), and then the wide-bandgap semiconductor element 511*b* transitions from the off state to the on state (turned on), and thus the current recirculates from the load 6 via the free-wheeling diode 512*b*.

As such, the power supplied to the load 6 is adjusted by adjusting an on/off ratio of the wide-bandgap semiconductor elements 511*a* and 511*b* in the power conversion device having the semiconductor oscillation suppression circuit 5. The power conversion device switches the wide-bandgap semiconductor elements 511*a* and 511*b* at high speed in order to supply the power to the load 6. Since the series resonance circuit is composed of the reactor 53 and a junction capacitance of the wide-bandgap semiconductor element 511*a*, voltage oscillation between the reactor 53 and the wide-bandgap semiconductor elements 511*a* and 511*b* is generated due to the switching of the wide-bandgap semiconductor elements 511*a* and 511*b* at high speed.

The semiconductor oscillation suppression circuit 5 has the snubber circuit 52 for suppressing the voltage oscillation. The resistance element 521 and the capacitor 522 provided in the snubber circuit 52 exert a function as a braking resistance against the series resonance circuit composed of the reactor 53 and the junction capacitance of the wide-bandgap semiconductor elements 511*a* and 511*b*. As a result, the semiconductor oscillation suppression circuit 5 suppresses voltage fluctuation that occurs at the time of switching of the wide-bandgap semiconductor elements 511*a* and 511*b*.

Figure 15A:
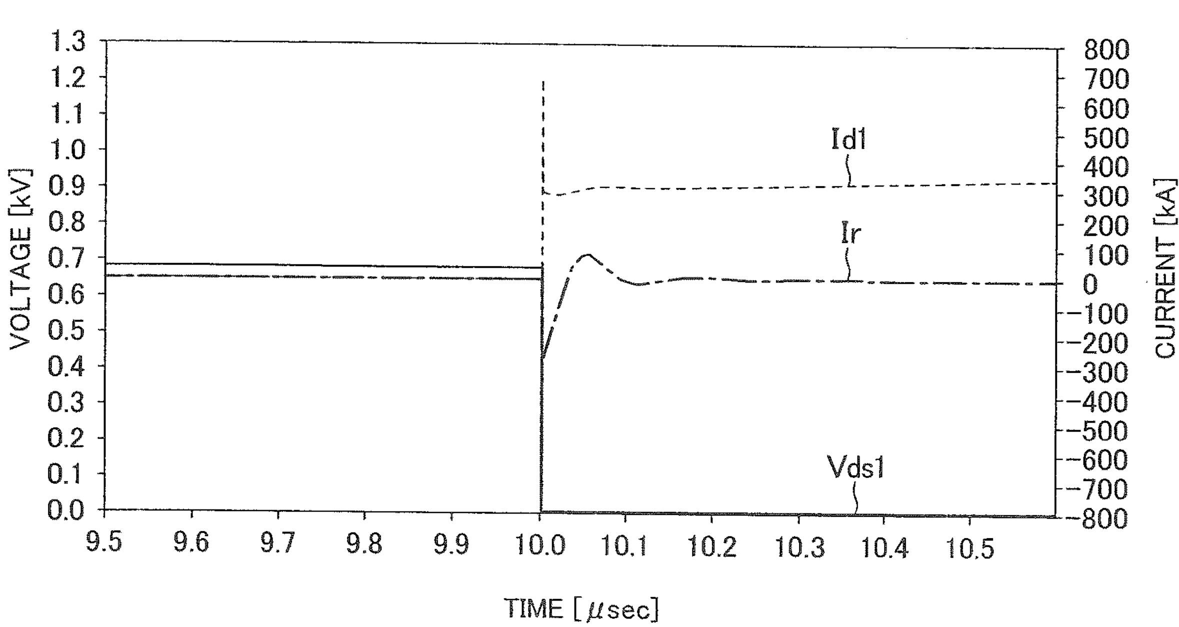
FIGS. 15A and 15B are diagrams illustrating a simulation result of an operation waveform at the time of switching of a semiconductor element included in the conventional semiconductor oscillation suppression circuit.
Figure 15B:
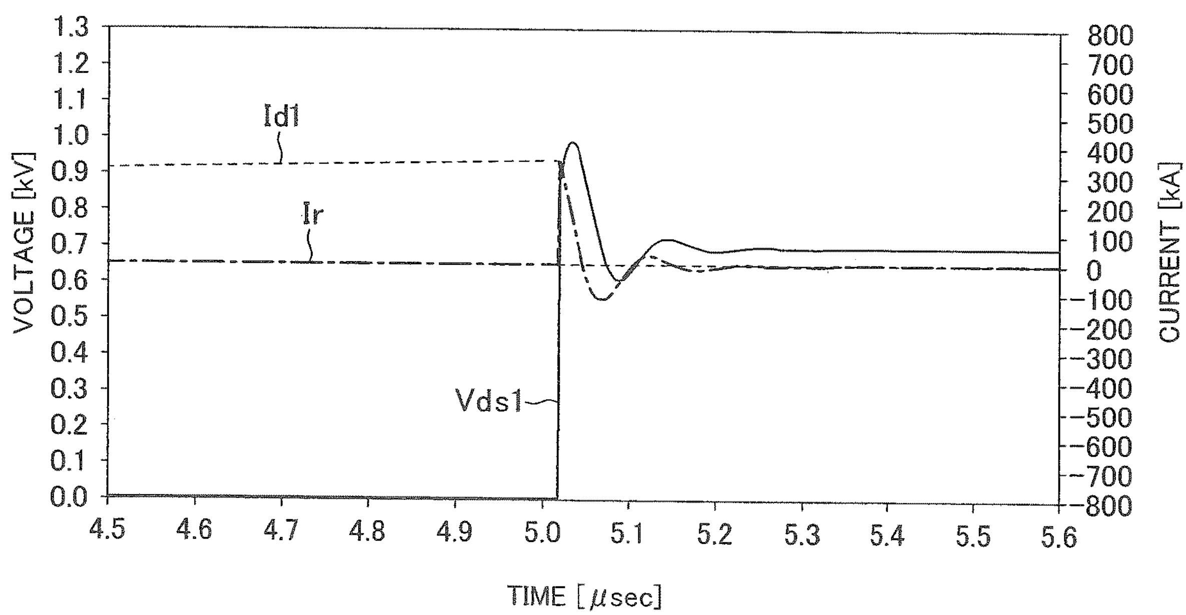

Here, an example of waveforms of an operation simulation of the semiconductor oscillation suppression circuit 5 will be described with reference to FIGS. 15A and 15B. FIGS. 15A and 15B illustrate waveforms of the operation simulation when an output voltage of the power supply 50 is 600 V, a current supplied to the load is 300 A, an inductance of the reactor 14 is 20 nH, a resistance value of the resistance element 521 is 0.5Ω, and a capacity of the capacitor 522 is 40 nF. "Vds1" indicated by a solid line in FIGS. 15A and 15B represents a voltage waveform of the wide-bandgap semiconductor element 511*a*. "Id1" indicated by a broken line in FIGS. 15A and 15B represents a current waveform of the wide-bandgap semiconductor element 511*a*. "Ir" indicated by an alternate long and short dash line in FIGS. 15A and 15B represents a current waveform of the resistance element 521. The vertical axis on the left side of FIGS. 15A and 15B represents a voltage for the voltage waveform of the wide-bandgap semiconductor element 511*a*. The vertical axis on the right side of FIGS. 15A and 15B represents a current for the current waveform of each of the wide-bandgap semiconductor element 511*a* and the resistance element 521. The horizontal axis of FIGS. 15A and 15B represents a time. The horizontal axis represents the lapse of time from left to right.

As illustrated in FIG. 15A, when the wide-bandgap semiconductor element 511*a* transitions from the off state to the on state (turned on) at the time of 10.0 μsec, the voltage oscillation of the wide-bandgap semiconductor element 511*a* is reduced by the snubber circuit 52. However, a surge current of about ±800 A is superimposed on the current Id1 flowing through the wide-bandgap semiconductor element 511*a* at the time of switching of the wide-bandgap semiconductor element 511*a*. Furthermore, a surge current of about +100 A to −300 A is superimposed on the current Ir flowing through the resistance element 521 of the snubber circuit 52 at the time of switching of the wide-bandgap semiconductor element 511*a*. Therefore, energy loss occurs in the snubber circuit 52.

As illustrated in FIG. 15B, even when the wide-bandgap semiconductor element 511*a* transitions from the on state to the off state (turned off) at the time of 5.02 μsec, the voltage oscillation of the wide-bandgap semiconductor element 511*a* is reduced by the snubber circuit 52. However, a surge current of about +400 A to −100 A is superimposed on the current Ir flowing through the resistance element 521 of the snubber circuit 52 at the time of switching of the wide-bandgap semiconductor element 511*a*. Therefore, energy loss occurs in the snubber circuit 52.

In contrast, as illustrated in FIGS. 13A and 13B, in the semiconductor oscillation suppression circuit 3 according to the present embodiment, a surge current superimposed on the current Ir flowing through the resistance element 521 at the time of switching of the wide-bandgap semiconductor element 111*a* is less than ±100 A. Therefore, it is possible for the semiconductor oscillation suppression circuit 3 to suppress the energy loss at the time of switching of the wide-bandgap semiconductor element 111*a*, as compared with the conventional semiconductor oscillation suppression circuit 5.

As described above, the semiconductor oscillation suppression circuit 3 according to the present embodiment includes the wide-bandgap semiconductor element 111*a* and the capacitor 13 connected to the wide-bandgap semiconductor element 111*a* in parallel and having a larger capacity than the junction capacitance of the wide-bandgap semiconductor element 111*a*.

As a result, it is possible for the semiconductor oscillation suppression circuit 3 to obtain the same effect as the semiconductor oscillation suppression circuit 1 according to the first embodiment. In addition, the semiconductor oscillation suppression circuit 3 includes the resistance element 31 instead of the transformer. As a result, it is possible for the semiconductor oscillation suppression circuit 3 to simplify the circuit configuration and reduce costs as compared with the semiconductor oscillation suppression circuit 1 according to the first embodiment.

[Effect of Respective Semiconductor Oscillation Suppression Circuits According to First Embodiment and Second Embodiment]

Next, an effect of the respective semiconductor oscillation suppression circuits according to the first embodiment and the second embodiment of the present invention will be described with reference to FIGS. 16 and 17 while referring to FIGS. 1, 12, and 14. First, the current waveform and the voltage waveform at the time of switching of the wide-bandgap semiconductor element will be described.

Figure 16A:
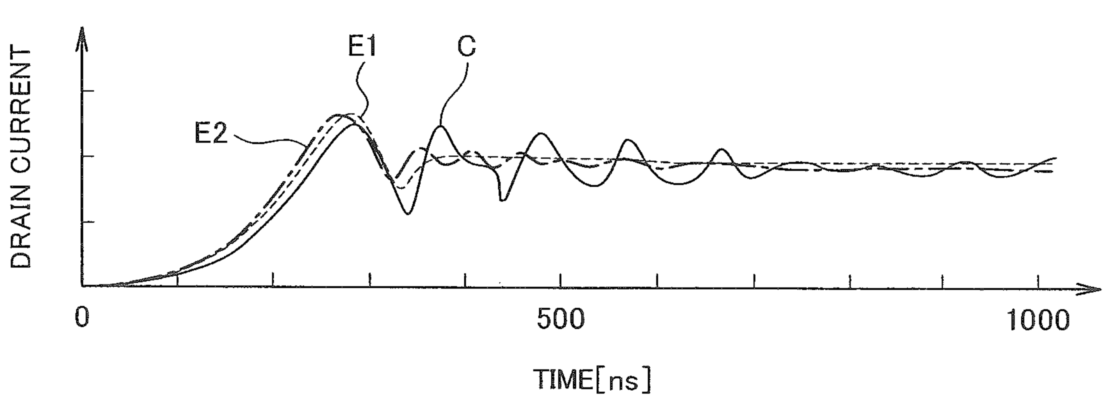
FIGS. 16A and 16B are diagrams (part 1) illustrating an effect of the semiconductor oscillation suppression circuit according to the first embodiment and the second embodiment of the present invention.
Figure 16B:
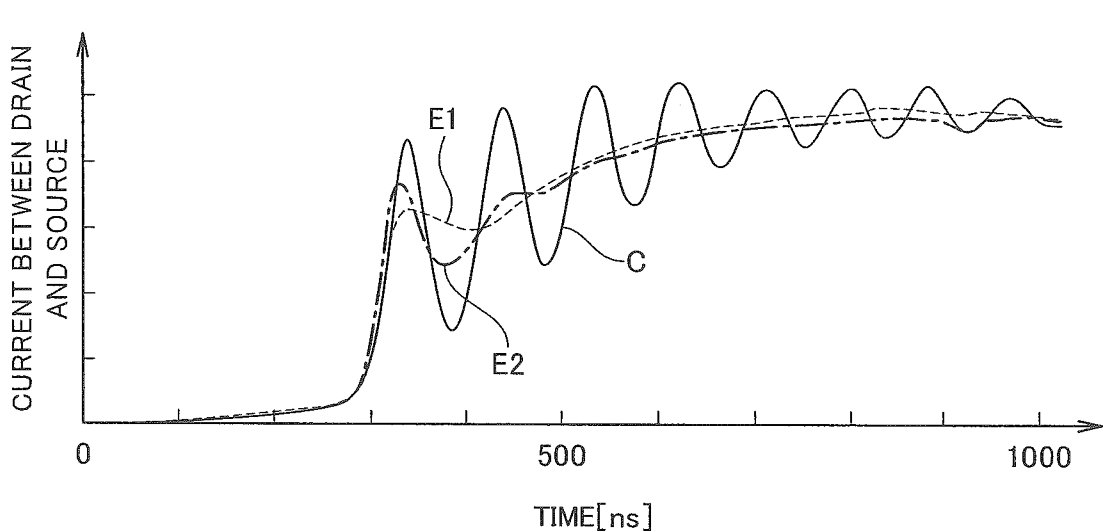

A vertical axis illustrated in FIG. 16A represents a drain current of the wide-bandgap semiconductor element. A vertical axis illustrated in FIG. 16B represents a voltage between the drain and the source of the wide-bandgap semiconductor element. A horizontal axis illustrated in FIGS. 16A and 16B represents a time, and lapse of the time is represented from left to right. "E1" illustrated in FIGS. 16A and 16B represents the semiconductor oscillation suppression circuit 1 according to the first embodiment. "E2" illustrated in FIGS. 16A and 16B represents the semiconductor oscillation suppression circuit 3 according to the second embodiment. "C" illustrated in FIGS. 16A and 16B represents the semiconductor oscillation suppression circuit 5 according to the comparative example.

A broken line illustrated in FIG. 16A indicates a current waveform of a drain current flowing through the wide-bandgap semiconductor element 111*a* provided in the semiconductor oscillation suppression circuit 1 (see FIG. 1). An alternate long and short dash line illustrated in FIG. 16A indicates a current waveform of a drain current flowing through the wide-bandgap semiconductor element 111*a* provided in the semiconductor oscillation suppression circuit 3 (see FIG. 12). A solid line illustrated in FIG. 16A indicates a current waveform of a drain current flowing through the wide-bandgap semiconductor element 511*a* provided in the semiconductor oscillation suppression circuit 5 (see FIG. 14). A broken line illustrated in FIG. 16B indicates a voltage waveform of a voltage between the drain and the source of the wide-bandgap semiconductor element 111*a* provided in the semiconductor oscillation suppression circuit 1 (see FIG. 1). An alternate long and short dash line illustrated in FIG. 16B indicates a voltage waveform of a voltage between the drain and the source of the wide-bandgap semiconductor element 111*a* provided in the semiconductor oscillation suppression circuit 3 (see FIG. 12). A solid line illustrated in FIG. 16B indicates a voltage waveform of a voltage between the drain and the source of the wide-bandgap semiconductor element 511*a* provided in the semiconductor oscillation suppression circuit 5 (see FIG. 14).

As illustrated in FIG. 16A, it is found that in the semiconductor oscillation suppression circuit 1 according to the first embodiment and the semiconductor oscillation suppression circuit 3 according to the second embodiment, the surge current superimposed on the drain current of the wide-bandgap semiconductor element 511*a* in the semiconductor oscillation suppression circuit 5 according to the comparative example is reduced. In addition, it is found that it is possible for the semiconductor oscillation suppression circuit 1 according to the first embodiment to further reduce the surge current superimposed on the drain current of the wide-bandgap semiconductor element 511*a*, as compared with the semiconductor oscillation suppression circuit 3 according to the second embodiment.

As illustrated in FIG. 16B, it is found that in the semiconductor oscillation suppression circuit 1 according to the first embodiment and the semiconductor oscillation suppression circuit 3 according to the second embodiment, a surge voltage superimposed on the voltage between the drain and the source of the wide-bandgap semiconductor element 511*a* in the semiconductor oscillation suppression circuit 5 according to the comparative example is reduced. In addition, it is found that it is possible for the semiconductor oscillation suppression circuit 1 according to the first embodiment to further reduce the surge voltage superimposed on the voltage between the drain and the source of the wide-bandgap semiconductor element 511*a*, as compared with the semiconductor oscillation suppression circuit 3 according to the second embodiment.

Next, energy loss in the semiconductor oscillation suppression circuit will be described. Table 1 shows an example of simulation results of the energy loss generated in the semiconductor oscillation suppression circuits according to the first embodiment, the second embodiment, and the comparative example. A "wide-bandgap semiconductor element rating" shown in Table 1 indicates an absolute maximum rating of the wide-bandgap semiconductor element provided in each semiconductor oscillation suppression circuit. A "withstand voltage" in a "wide-bandgap semiconductor element rating" column indicates an absolute maximum rated voltage, and a "current" in the column indicates an absolute maximum rated current. The "comparative example" represents the semiconductor oscillation suppression circuit 5 according to the comparative example, the "first embodiment" represents the semiconductor oscillation suppression circuit 1 according to the first embodiment, and the "second embodiment" represents the semiconductor oscillation suppression circuit 3 according to the second embodiment.

In Table 1, "R521" of a "constant" in a "comparative example" column represents the resistance element 521 (see FIG. 14) provided in the semiconductor oscillation suppression circuit 5, and "C522" of the "constant" in the column represents the capacitor 522 (see FIG. 14) provided in the semiconductor oscillation suppression circuit 5. "Element loss" in the "comparative example" column represents the energy loss in the resistance element 521 and the capacitor 522, "switching loss" in the column represents the energy loss in the wide-bandgap semiconductor elements 511*a* and 511*b* provided in the semiconductor oscillation suppression circuit 5, and "total loss" in the column represents the total loss of the "element loss" and the "switching loss".

In Table 1, "L14" of a "constant" in a "first embodiment" column and a "second embodiment" column represents the reactor 14 (see FIGS. 1 and 12) provided in the semiconductor oscillation suppression circuits 1 and 3, and "C13" of the "constant" in the column represents the capacitor 13 (see FIGS. 1 and 12) provided in the semiconductor oscillation suppression circuits 1 and 3. "R31" of the "constant" in the "second embodiment" column represents the resistance element 31 (see FIG. 12) provided in the semiconductor oscillation suppression circuit 3. "Element loss" in the "first embodiment" column represents the energy loss in the reactor 14 and the capacitor 13, "switching loss" in the column represents the energy loss in the wide-bandgap semiconductor elements 111*a* and 111*b* provided in the semiconductor oscillation suppression circuit 1, and "total loss" in the column represents the total loss of the "element loss" and the "switching loss". "Element loss" in the "second embodiment" column represents the energy loss in the reactor 14, the capacitor 13, and the resistance element 31, "switching loss" in the column represents the energy loss in the wide-bandgap semiconductor elements 111*a* and 111*b* provided in the semiconductor oscillation suppression circuit 3, and "total loss" in the column represents the total loss of the "element loss" and the "switching loss".

TABLE 1

| Wide-Bandgap Semiconductor Element | | Comparative Example | | | | | First Embodiment | | |
|---|---|---|---|---|---|---|---|---|---|
| | | Constant | | | | | Constant | | |
| Withstand Voltage (V) | Current (A) | R521 (Ω) | C522 (nF) | Total Loss | Element Loss | Switching Loss | L14 (nH) | C13 (nF) | Total Loss |
| 1200 | 35 | 2 | 10 | 2.2 | 2.0 | 0.2 | 100 | 1 | 5.9 |
| | 75 | 2 | 10 | 9.5 | 9.0 | 0.5 | 50 | 2 | 11.7 |
| | 150 | 1 | 20 | 54.9 | 54.9 | 0.9 | 35 | 4 | 25.6 |
| | 300 | 0.5 | 40 | 145.8 | 144 | 1.8 | 20 | 8 | 53.5 |

| Wide-Bandgap Semiconductor Element | | First Embodiment | | Second Embodiment | | | | | |
|---|---|---|---|---|---|---|---|---|---|
| | | | | Constant | | | | | |
| Withstand Voltage (V) | Current (A) | Element Loss | Switching Loss | L14 (nH) | C13 (nF) | R31 (Ω) | Total Loss | Element Loss | Switching Loss |
| 1200 | 35 | 1.7 | 4.2 | 100 | 1 | 10 | 7.2 | 3.0 | 4.2 |
| | 75 | 2.5 | 9.2 | 50 | 2 | 10 | 15.5 | 6.3 | 9.2 |
| | 150 | 5 | 20.6 | 35 | 4 | 10 | 33.3 | 12.7 | 20.6 |
| | 300 | 10 | 43.5 | 20 | 8 | 10 | 68.8 | 25.4 | 43.4 |

Figure 17:
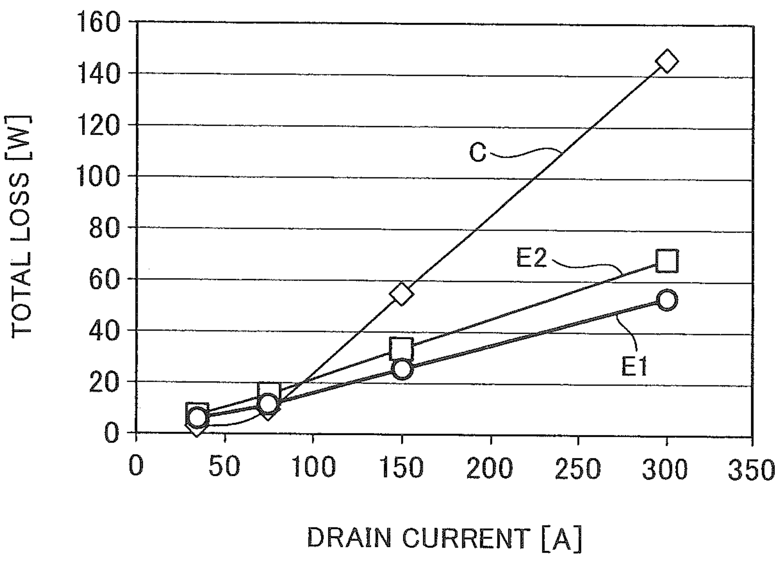
FIG. 17 is a diagram (part 2) illustrating an effect of the semiconductor oscillation suppression circuit according to the first embodiment and the second embodiment of the present invention.

FIG. 17 is a graph in which a horizontal axis represents a "current" in the "wide-bandgap semiconductor element" column in Table 1, and a vertical axis represents the "total loss" in the "comparative example" column, the "first embodiment" column, and the "second embodiment" column. "C" indicated by connecting the 0 marks in FIG. 17 represents characteristics of the total loss in the semiconductor oscillation suppression circuit 5 according to the comparative example, "E1" indicated by connecting the ○ marks in FIG. 17 represents characteristics of the total loss in the semiconductor oscillation suppression circuit 1 according to the first embodiment, and "E2" indicated by connecting □ marks in FIG. 17 represents characteristics of the total loss in the semiconductor oscillation suppression circuit 3 according to the second embodiment.

As illustrated in FIG. 17, in the semiconductor oscillation suppression circuit 1 according to the first embodiment and the semiconductor oscillation suppression circuit 3 according to the second embodiment, the energy loss is reduced as compared with the semiconductor oscillation suppression circuit 5 according to the comparative example. Particularly, as the current (that is, the drain current) flowing through the wide-bandgap semiconductor elements 111*a* and 111*b* becomes larger, an effect of reducing the energy loss becomes remarkable.

As illustrated in FIG. 17, when the semiconductor oscillation suppression circuit is operated such that, for example, the voltage of the power supply is set to 600 V, the load current (that is, the drain current of the wide-bandgap semiconductor element) supplied to the load is set to 300 A, and a switching frequency of the wide-bandgap semiconductor element is set to 20 kHz, the energy (power) of 140 W or more is consumed. In the semiconductor oscillation suppression circuit 5, the snubber circuit 52 should be disposed in the immediate vicinity of the wide-bandgap semiconductor elements 511*a* and 511*b* in order to enhance the suppression effect of voltage oscillation and current oscillation. In order to enable the energy consumption of 140 W in the snubber circuit 52, it is necessary to increase the size of the resistance element 521. However, since the large-sized resistance element 521 generates a large amount of heat, it is difficult to dispose the snubber circuit 52 in the immediate vicinity of the wide-bandgap semiconductor elements 511*a* and 511*b*. Therefore, there is a problem that the conventional semiconductor oscillation suppression circuit 5 is hardly applied to a device having a large capacity of several hundred amperes to several thousand amperes.

On the other hand, as illustrated in FIG. 17, the energy consumption of the semiconductor oscillation suppression circuit 3 according to the second embodiment is about 70 W, which is about half of that of the semiconductor oscillation suppression circuit 5 according to the comparative example. Further, the energy consumption of the semiconductor oscillation suppression circuit 1 according to the first embodiment is about 5 W, which is about 1/28 of that of the semiconductor oscillation suppression circuit 5 according to the comparative example. A component in which the energy loss occurs in the semiconductor oscillation suppression circuit 3 (that is, a component generating heat) is the resistance element 31. It is possible to dispose the capacitor 13 for oscillation suppression in the semiconductor oscillation suppression circuit 3 without needing to dispose the resistance element 31 in the immediate vicinity of the wide-bandgap semiconductor elements 111*a* and 111*b*.

Further, the semiconductor oscillation suppression circuit 1 according to the first embodiment has a smaller energy loss than the semiconductor oscillation suppression circuit 3 according to the second embodiment. In the semiconductor oscillation suppression circuit 3 according to the second embodiment, the energy accumulated in the capacitor 13 and the reactor 14 is consumed by the resistance element 31, such that the energy loss increases as compared with the semiconductor oscillation suppression circuit 1. However, since the semiconductor oscillation suppression circuit 3 does not need to include the transformer, it is possible to simplify the circuit configuration and reduce the size and costs.

The primary winding 181 and the secondary winding 182 of the transformer 18 are connected to the power supply 10 via the diode 19 in the semiconductor oscillation suppression circuit 1. As a result, a voltage increment ΔV (see FIGS. 2 and 8) from the voltage VCS of the capacitor 13 is regenerated to the power supply 10 in relation to a winding ratio n of the primary winding 181 and the secondary winding 182 of the transformer 18. The output voltage of the power supply 10 is a value obtained by multiplying the winding ratio n by the voltage increment ΔV. Therefore, the voltage increment ΔV is a value obtained by dividing the output voltage of the power supply 10 by the winding ratio. Therefore, in the semiconductor oscillation suppression circuit 1, the voltage of the capacitor 13 is increased by the voltage increment ΔV as compared with the semiconductor oscillation suppression circuit 3, but the energy loss is lower than that in which the resistance element 31 is used.

Therefore, it is possible for the semiconductor oscillation suppression circuit 1 and the semiconductor oscillation suppression circuit 3 to obtain the maximum effect by appropriately selecting the semiconductor oscillation suppression circuit 1 and the semiconductor oscillation suppression circuit 3 in consideration of the respective viewpoints of energy loss, circuit scale, and costs.

The technical scope of the present invention is not limited to the illustrative embodiments described and illustrated in drawings, and includes all embodiments which produce effects equivalent to those intended by the present invention. Furthermore, the technical scope of the present invention is not limited to the combination of the respective features of the invention defined by claims, and may be defined by any desired combination of specific features among all disclosed features.

REFERENCE SIGNS LIST

- 1, 3, 5 semiconductor oscillation suppression circuit
- 10, 30, 50 power supply
- 11*a*, 11*b*, 51*a*, 51*b* semiconductor module
- 12, 32 wiring
- 13, 17, 33, 37, 522 capacitor
- 14, 53 reactor
- 15, 16, 19 diode
- 18 transformer
- 31, 521 resistance element
- 52 snubber circuit
- 101, 301 first current path
- 102, 302 second current path
- 103 third current path
- 111*a*, 111*b*, 511*a*, 511*b* wide-bandgap semiconductor element
- 112*a*, 112*b*, 512*a*, 512*b* free-wheeling diode
- 121, 321 first wiring portion
- 122 second wiring portion
- 181 primary winding
- 182 secondary winding

The invention claimed is:

1. A semiconductor oscillation suppression circuit comprising:

a first wide-bandgap semiconductor element having a source and a drain;

a free-wheeling diode connected in inverse-parallel with the first wide-bandgap semiconductor element;

a first capacitor connected to the first wide-bandgap semiconductor element in parallel and having a larger capacity than a junction capacitance of the first wide-bandgap semiconductor element;

a second diode connected to the first wide-bandgap semiconductor element in parallel, and in series with the first capacitor;

a power supply configured to supply power to the first wide-bandgap semiconductor element; and a second wide-bandgap semiconductor element connected to the first wide-bandgap semiconductor element in series between a positive electrode side and a negative electrode side of the power supply, wherein a cathode of the free-wheeling diode is connected to the drain of the first wide-bandgap semiconductor element and an anode of the second diode, a cathode of the second diode is connected to one electrode of the first capacitor, the other electrode of the first capacitor is connected to the source of the first wide-bandgap semiconductor element and an anode of the free-wheeling diode, the first wide-bandgap semiconductor element is connected to the positive electrode side of the power supply, the second wide-bandgap semiconductor element is connected to the negative electrode side of the power supply, and a charging speed of the first capacitor being suppressed by the voltage increase rate of the first wide-bandgap semiconductor element as the first wide-bandgap semiconductor element is turned off.

2. The semiconductor oscillation suppression circuit according to claim 1, further comprising:

a wiring connecting the power supply with the first wide-bandgap semiconductor element and the first capacitor.

3. The semiconductor oscillation suppression circuit according to claim 2, further comprising:

a first current path having a part of the wiring, the second diode and the one electrode of the first capacitor.

4. The semiconductor oscillation suppression circuit according to claim 3, further comprising:

a second current path having the part of the wiring and the first capacitor.

5. The semiconductor oscillation suppression circuit according to claim 4, wherein the first current path has a resistance element connected between an end of the part of the wiring on a side of the power supply and the one electrode of the first capacitor.

6. The semiconductor oscillation suppression circuit according to claim 4, wherein the first current path has a transformer disposed between an end of the part of the wiring on a side of the power supply and the one electrode of the first capacitor, and the transformer has a primary winding connected between the end of the part of the wiring and the one electrode of the first capacitor.

7. The semiconductor oscillation suppression circuit according to claim 4, further comprising:

a reactor provided in the part of the wiring.

8. The semiconductor oscillation suppression circuit according to claim 4, wherein the first current path has the second diode and a third diode connected in series between the positive electrode side and the negative electrode side of the power supply to be in a forward direction, and the one electrode of the first capacitor is connected to a connection portion between the second diode and the third diode.

9. The semiconductor oscillation suppression circuit according to claim 3, wherein the first current path has a resistance element connected between an end of the part of the wiring on a side of the power supply and the one electrode of the first capacitor.

10. The semiconductor oscillation suppression circuit according to claim 9, further comprising:

a reactor provided in the part of the wiring.

11. The semiconductor oscillation suppression circuit according to claim 3, wherein the first current path has a transformer disposed between an end of the part of the wiring on a side of the power supply and the one electrode of the first capacitor, and the transformer has a primary winding connected between the end of the part of the wiring and the one electrode of the first capacitor.

12. The semiconductor oscillation suppression circuit according to claim 11, further comprising:

a third current path having the power supply, the other part of the wiring, and the transformer, wherein the transformer has a secondary winding connected to the other part of the wiring.

13. The semiconductor oscillation suppression circuit according to claim 12, wherein the third current path has a first diode having a cathode connected to the transformer and an anode connected to a negative electrode side of the power supply.

14. The semiconductor oscillation suppression circuit according to claim 3, further comprising:

a reactor provided in the part of the wiring.

15. The semiconductor oscillation suppression circuit according to claim 3, wherein the first current path has the second diode and a third diode connected in series between the positive electrode side and the negative electrode side of the power supply to be in a forward direction, and the one electrode of the first capacitor is connected to a connection portion between the second diode and the third diode.

16. The semiconductor oscillation suppression circuit according to claim 15, further comprising:

a second capacitor connected between a cathode of the third diode and the negative electrode side of the power supply.

17. The semiconductor oscillation suppression circuit according to claim 16, wherein the power supply supplies power to the second wide-bandgap semiconductor element.

18. The semiconductor oscillation suppression circuit according to claim 17, wherein the first wide-bandgap semiconductor element and the second wide-bandgap semiconductor element are a SiC device, a GaN device, or a GaAs device.

19. The semiconductor oscillation suppression circuit according to claim 17, wherein the power supply is a direct current power supply or a capacitor having a larger capacity than the first capacitor and the second capacitor.

20. The semiconductor oscillation suppression circuit according to claim 16, wherein the power supply is a direct current power supply or a capacitor having a larger capacity than the first capacitor and the second capacitor.

* * * * *